(12) United States Patent
Obika

(10) Patent No.: US 7,469,089 B2
(45) Date of Patent: Dec. 23, 2008

(54) LIGHT RECEIVING APPARATUS

(75) Inventor: Akira Obika, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/536,767

(22) Filed: Sep. 29, 2006

(65) Prior Publication Data
US 2007/0081784 A1   Apr. 12, 2007

(30) Foreign Application Priority Data
Sep. 29, 2005  (JP) ............... 2005-285681

(51) Int. Cl.
G02B 6/32 (2006.01)
G02B 6/10 (2006.01)

(52) U.S. Cl. .................... 385/125; 385/146
(58) Field of Classification Search ............... 385/125, 385/146
See application file for complete search history.

(56) References Cited

U.S. PATENT DOCUMENTS 5,802,236 A * 9/1998 DiGiovanni et al. ........ 385/127

2001/0026667 A1 * 10/2001 Kawanishi et al. .......... 385/125
2003/0231846 A1 * 12/2003 Fajardo et al. ............. 385/125
2004/0096173 A1 *  5/2004 Fekety et al. .............. 385/125
2004/0233941 A1 * 11/2004 Fajardo et al. ............... 372/6

FOREIGN PATENT DOCUMENTS

| JP | 07-261028 A | 10/1995 |
|---|---|---|
| JP | 09-090132 A | 4/1997 |
| JP | 10-190581 A | 7/1998 |
| JP | 2000-216732 A | 8/2000 |
| JP | 2003-244295 A | 8/2003 |

OTHER PUBLICATIONS

Choi, S, et al., "Novel Mode Converter Based Optical Fiber for Gigabit LAN Communication", IEEE Photonic Technology Letters, vol. 14, No. 2, 248-50 (2002).*

* cited by examiner

*Primary Examiner*—Charlie Peng
(74) *Attorney, Agent, or Firm*—Keating & Bennett, LLP

(57) ABSTRACT

A light receiving apparatus connects light to a light receiving device through a tube-type waveguide for making uniform the light intensity distribution of light. The light receiving apparatus is capable of stably receiving optical data even if partiality occurs in the NFP of the light emitted from an end of an optical fiber or even if the partiality of the NFP fluctuates.

16 Claims, 22 Drawing Sheets

| SHAPE NO. | SECTIONAL SHAPE |
|---|---|
| SHAPE 7 |  |

| SHAPE NO. | SECTIONAL SHAPE |
|---|---|
| SHAPE 8 |  |

| SHAPE NO. | SECTIONAL SHAPE |
|---|---|
| SHAPE 11 |  |

| SHAPE NO. | SECTIONAL SHAPE |
|---|---|
| SHAPE 8 |  |

| SHAPE NO. | SECTIONAL SHAPE |
|---|---|
| SHAPE 13 |  |

| SHAPE NO. | SECTIONAL SHAPE |
|---|---|
| SHAPE 14 |  |

| SHAPE NO. | SECTIONAL SHAPE |
|---|---|
| SHAPE 15 |  |

| SHAPE NO. | SECTIONAL SHAPE |
|---|---|
| SHAPE 16 |  |

| SHAPE NO. | SECTIONAL SHAPE |
|---|---|
| SHAPE 17 |  |

| SHAPE NO. | SECTIONAL SHAPE |
|---|---|
| SHAPE 18 |  |

| SHAPE NO. | SECTIONAL SHAPE |
|---|---|
| SHAPE 19 |  |

| SHAPE NO. | SECTIONAL SHAPE |
|---|---|
| SHAPE 20 |  |

LIGHT RECEIVING APPARATUS

BACKGROUND OF THE INVENTION

1. Field of the Invention

The present invention relates to a light receiving apparatus for transmitting data between modules.

2. Description of the Related Art

As cell phones which have been generalized in recent years, folding-type, slide-type, or rotary-type cell phones have been frequently used for reasons associated with convenience. The folding-type, slide-type, and rotary-type cell phones are configured such that modules such as a communicating functional portion, amplifying circuit portion, and display circuit portion are separately arranged in a plurality of frames, and the wiring that connects these modules arranged in the frames is required to be flexible and strong enough to withstand driving.

The wiring between modules is further required to have a high-speed data transmission property, which is due to the multifunctionality of cell phones such as a music reproducing function, motion-picture reproducing function, and photographing function; prevent electromagnetic interference relative to external units; and consume low power, which is due to the desire for longer use between charging.

An attempt is being made to use optical fibers as wiring satisfying the above demands (for example, see Japanese Unexamined Patent Publication No. 2003-244295). A module performing optical data transmission by being connected to other modules with optical fibers will be hereinafter referred to as an optical communication module.

When using an optical fiber for wiring between modules, a light-emitting device for emitting light through an optical fiber and a light receiving device for receiving the light emitted through the optical fiber are mounted in a module, and data transmission is performed when the light receiving device receives the light emitted from the light emitting device and propagated through the optical fiber. For smooth data transmission, it is necessary to align the optical axis between the light emitting device and the optical fiber and the optical axis between the optical fiber and the light receiving device. In the following description, "to align optical axes" will be hereinafter briefly referred to as "alignment".

For simple alignment, it is preferable to increase the core diameter of an optical fiber. With an increased core diameter of the optical fiber, however, when alignment is performed between a light emitting device with the optical fiber, due to an assembling error, light may come in from some other portion than the central axis of the optical fiber.

When the optical path of an optical fiber is long, even if light comes in from some other portion than the central axis of the optical fiber, the light is scrambled through the optical fiber during propagation, and thus a near-field pattern at the other end of the optical fiber becomes uniform. (Hereinafter, the "near field pattern" will be abbreviated to "NFP".)

However, in the case of an optical fiber for connecting modules of a cell phone, where the optical path length is as short as several centimeters and thus the mode scramble effect is small, when light comes in from some other portion than the central axis of the optical fiber, the light is not sufficiently scrambled during propagation, and thus the NFP at the other end of the optical fiber becomes non-uniform. Even if light comes in from the central axis of the optical fiber, when there is a steep bend with a curvature radius of approximately 5 mm in the optical fiber, partiality occurs in the light intensity distribution of the light in accordance with the bend, and thus the NFP at the other end of the optical fiber becomes non-uniform.

There is a demand for a reduction in the diameter of the light receiving plane of a light receiving device in order to perform high-speed data communication. However, when the diameter of the light receiving plane of the light receiving device is small, the light receiving device cannot receive all of the light emitted from the other end of the optical fiber, but can only receive light from a portion of the other end plane of the optical fiber.

Therefore, when the core diameter of an optical fiber is large and the diameter of the light receiving plane of a light receiving device is small, the light receiving device may not receive a sufficient quantity of light because of a non-uniform NFP, depending on relative positions of the optical fiber and the light receiving device.

Moreover, because the state of the bend of an optical fiber fluctuates due to a folding or rotating operation of a cell phone, the NFP also fluctuates in accordance with the state of the bend.

Therefore, even if the accuracy of assembly of an optical fiber and a light receiving device is improved and alignment is performed according to the NFP, the light receiving device cannot receive a sufficient quantity of light and thus may not be able to stably transmit data.

SUMMARY OF THE INVENTION

In order to overcome the problems described above, preferred embodiments of the present invention provide a light receiving apparatus capable of stably receiving optical data even if partiality occurs in the NFP of light emitted from an end of an optical fiber or even if the partiality of the NFP fluctuates.

According to a preferred embodiment of the present invention, a light receiving apparatus connects light with a light receiving device through a tube-type waveguide for making uniform the optical intensity distribution of light.

Specifically, a preferred embodiment of the present invention provides a light receiving apparatus including a tube-type waveguide having an optical waveguiding region for propagating light entering an incident end to an emission end of the tube-type waveguide through mirror reflection or total reflection, a cross sectional shape of the optical waveguiding region vertical to a propagating direction of light being polygonal; and a light receiving device connected to the emission end of the tube-type waveguide to receive the light from the tube-type waveguide.

The tube-type waveguide leads the light entering the incident end to the emission end through mirror reflection or total reflection at a reflection plane surrounding the optical waveguiding region.

When the shape of a cross section vertical to the light propagating direction in the optical waveguiding region of a tube-type waveguide (hereinafter, "the shape of a cross section vertical to the light propagating direction" will be briefly referred to as "the cross sectional shape") is circular, the light from the incident end easily produces a stationary wave (mode) passing through the center of the circle through mirror reflection or total reflection, and thus the light intensity distribution of a cross section vertical to the light propagating direction of the tube-type waveguide (hereinafter, "the light intensity distribution of a cross section vertical to the light propagating direction" will be briefly referred to as "the cross-sectional light intensity distribution") easily becomes strong in light intensity near the center.

Moreover, when the sectional shape of the optical waveguiding region of a tube-type waveguide is circular, the mode scramble effect is small, and thus when light comes in from some other portion than the central axis, the light is propagated while the distribution of a cross-sectional light intensity remains partial.

However, because the cross sectional shape of the optical waveguiding region of the tube-type waveguide of a light receiving apparatus of the present preferred embodiment is polygonal, the mode scramble effect is large because the optical path becomes complex, and waveguiding light is scrambled at every mirror reflection or total reflection. Even if the tube-type waveguide has a short optical path, the cross-sectional light intensity distribution is made uniform, and the NFP of the light at the emission end is made uniform. Therefore, even if an assembling error occurs between the light receiving device and the tube-type waveguide, the light receiving device can receive a sufficient quantity of light.

Even if partiality of the NFP of the light occurs at an end of the optical fiber, by connecting an end of an optical fiber to the incident end of the light receiving apparatus, the tube-type waveguide can mitigate the partiality of the NFP of the light from the optical fiber.

Therefore, the present preferred embodiment can provide a light receiving apparatus capable of stably receiving optical data even if the NFP of light emitted from an optical fiber is partial or even if the partiality of the NFP fluctuates.

In the following description, "tube-type waveguide in which the sectional shape of the optical waveguiding region is polygonal" will be briefly referred to as "polygonal tube-type waveguide".

According to another preferred embodiment of the present invention, a light receiving apparatus includes a tube-type waveguide having an optical waveguiding region for propagating light entering an incident end to an emission end of the tube-type waveguide through mirror reflection or total reflection, a cross sectional shape of the optical waveguiding region vertical to a propagating direction of light being rounded-corner polygonal; and a light receiving device connected to the emission end of the tube-type waveguide to receive the light from the tube-type waveguide.

The rounded-corner polygon has a shape in which at least one of the vertexes of the polygon is rounded. Because the sectional shape of the waveguiding region of the tube-type waveguide of the light receiving apparatus is a rounded-corner polygon, the same advantageous effects as the case of the above polygonal tube-type waveguide can be obtained.

Therefore, the present preferred embodiment provides a light receiving apparatus capable of stably receiving optical data even if partiality occurs in the NFP of light emitted from an end of an optical fiber or even if the partiality of the NFP fluctuates.

According to another preferred embodiment of the present invention, a light receiving apparatus includes a tube-type waveguide having an optical waveguiding region for propagating light entering an incident end to an emission end of the tube-type waveguide through mirror reflection or total reflection, a cross sectional shape of the optical waveguiding region vertical to a propagating direction of light being a shape surrounded by a single closed curve having a plurality of curvatures; and a light receiving device connected to the emission end of the tube-type waveguide to receive the light from the tube-type waveguide.

The cross sectional shape of the tube-type waveguide of the light receiving apparatus of the present preferred embodiment is a shape surrounded by a single closed curve having a plurality of curvatures. (Hereinafter, the "shape surrounded by a single closed curve having a plurality of curvatures" will be briefly referred to as a "single closed-curve shape".) Because the cross sectional shape of the optical waveguiding region of the tube-type waveguide of the light receiving apparatus is a single closed-curve shape, it is possible to obtain the same advantageous effects as the case of the above polygonal tube-type waveguide.

Therefore, the present preferred embodiment can provide a light receiving apparatus capable of stably receiving optical data even if partiality occurs in the NFP of light emitted from an end of an optical fiber or even if the partiality of the NFP fluctuates.

According to another preferred embodiment of the present invention, a light receiving apparatus includes a tube-type waveguide having an optical waveguiding region for propagating light entering an incident end to an emission end of the tube-type waveguide through mirror reflection or total reflection, a cross sectional shape of the optical waveguiding region vertical to a propagating direction of light being a shape surrounded by a plurality of curves connected together at respective ends thereof, the points of connection of the plurality of curves being rendered points of singularity; and a light receiving device connected to the emission end of the tube-type waveguide to receive the light from the tube-type waveguide.

The cross sectional shape of the tube-type waveguide of the light receiving apparatus of the present preferred embodiment is a shape surrounded by a plurality of curves connected together at the respective ends of the curves with the points of connection of the curves being rendered points of singularity. (Hereinafter, "the shape surrounded by a plurality of curves connected together at the respective ends of the curves with the points of connection of the curves being rendered points of singularity" will be briefly referred to as "a plural-curves shape".) Because the sectional shape of the optical waveguiding region of the tube-type waveguide of the light receiving apparatus of the present preferred embodiment is a plural-curves shape, it is possible to obtain the same advantageous effects as the case of the above polygonal tube-type waveguide.

Therefore, the present preferred embodiment can provide a light receiving apparatus capable of stably receiving optical data even if partiality occurs in the NFP of the light emitted from an end of an optical fiber or even if the partiality of the NFP fluctuates.

According to another preferred embodiment of the present invention, a light receiving apparatus includes a tube-type waveguide having an optical waveguiding region for propagating light entering an incident end to an emission end of the tube-type waveguide through mirror reflection or total reflection, a cross sectional shape of the optical waveguiding region vertical to a propagating direction of light being a shape surrounded by at least one line segment and at least one curve, the at least one line segment and the at least one curve being connected together at respective ends thereof; and a light receiving device connected to the emission end of the tube-type waveguide to receive the light from the tube-type waveguide.

The sectional shape of the optical waveguiding region of the tube-type waveguide of the light receiving apparatus of the present preferred embodiment is a shape surrounded by at least one line segment and at least one curve connected together at the respective ends of the line segment and the curve. (Hereinafter, "the shape surrounded by at least one line segment and at least one curve connected together at the respective ends of the line segment and the curve" will be briefly referred to as "a segmented curve shape".) Because the cross sectional shape of the optical waveguiding region of the tube-type waveguide of the light receiving apparatus of the present preferred embodiment is a segmented curve shape, it is possible to obtain the same advantageous effects as the case of the above polygonal tube-type waveguide.

Therefore, the present preferred embodiment can provide a light receiving apparatus capable of stably receiving optical data even if partiality occurs in the NFP of the light emitted from an end of an optical fiber or even if the partiality of the NFP fluctuates.

In the light receiving apparatus of another preferred embodiment, it is preferable that the size of the optical waveguiding region at the plane of the emission end of the tube-type waveguide is larger than the size of the light receiving plane of the light receiving device.

Because the size of the light receiving plane of the light receiving device and the size of the optical waveguiding region at the plane of the emission end of the tube-type waveguide have the relationship as described above, it is possible to obtain the alignment between the light receiving device and the tube-type waveguide. Because the tube-type waveguide makes uniform the NFP of light at the emission end, the light receiving device can receive a sufficient quantity of light even if there is an assembling error between the light receiving device and the tube-type waveguide.

Therefore, the present preferred embodiment can provide a light receiving apparatus capable of mitigating the alignment accuracy between the light receiving apparatus and the tube-type waveguide and stably receiving optical data even if partiality occurs in the NFP of the light emitted from an end of an optical fiber or even if the partiality of the NFP fluctuates.

A light receiving apparatus of another preferred embodiment may further include a multimode optical fiber for use in transmitting light into the optical waveguiding region of the tube-type waveguide from one end of the optical fiber connected to the incident end of the tube-type waveguide.

In the light receiving apparatus, a multimode-type optical fiber is connected to the incident end of the tube-type waveguide. As a result of using the optical fiber, the tube-type waveguide can mitigate the cross-section light intensity distribution of the light from the optical fiber even in a case of a bend caused by a short optical path thereby causing partiality in the NFP of the light at an end of the optical fiber. Because the NFP of the light at the emission end is made uniform, the light receiving device can receive a sufficient quantity of light even if there is an assembling error between the light receiving device and the tube-type waveguide.

Therefore, the present preferred embodiment can provide a light receiving apparatus capable of stably receiving optical data even if partiality occurs in the NFP of the light emitted from an end of an optical fiber or even if the partiality of the NFP fluctuates.

In the light receiving apparatus of another preferred embodiment, it is preferable that the size of the optical waveguiding region at the plane of the incident end of the tube-type waveguide is larger than the size of a core at the plane of the one end of the optical fiber.

Because the size of the core of the optical fiber and the size of the optical waveguiding region at the plane of the incident end of the tube-type waveguide have the relationship described above, it is possible to obtain alignment between the optical fiber and the tube-type waveguide. That is, even if there is an assembling error between the optical fiber and the optical waveguiding region, the optical fiber can transmit all of the light into the optical waveguiding region of the tube-type waveguide. Because the NFP of the light at the emission end is made uniform, it is possible that the light receiving device receives a sufficient quantity of light even if there is an assembling error between the light receiving device and the tube-type waveguide and between the optical fiber and the tube-type waveguide.

Therefore, the present preferred embodiment can provide a light receiving apparatus capable of stably receiving optical data even if partiality occurs in the NFP of the light emitted from an end of an optical fiber or partiality of the NFP fluctuates.

In the light receiving apparatus of another preferred embodiment, it is preferable that the area of the cross sectional shape of the optical waveguiding region of the tube-type waveguide vertical to the propagating direction of light decreases uniformly from the incident end to the emission end.

In the following description, "the tube-type waveguide in which the area of the cross sectional shape of the optical waveguiding region vertical to the propagating direction of light decreases uniformly from the incident end to the emission end" will be briefly referred to as "a taper-type waveguide".

This tube-type waveguide of the light receiving apparatus has the same advantageous effects as those of the above polygonal tube-type waveguide.

Moreover, because the tube-type waveguide is a taper-type waveguide, an incident angle at the reflection plane of light from the incident end gradually decreases through repeated reflection. Thus, the NFP of the light from the incident end is spread and the number of times of reflection at the reflection plane of light from the incident end is increased. Thus, the tube-type waveguide makes uniform the cross-section light intensity distribution of light from the incident end.

Therefore, the present preferred embodiment can provide a light receiving apparatus capable of stably receiving optical data and having a small transmission loss even if partiality occurs in the NFP of light emitted from an end of an optical fiber or even if the partiality of the NFP fluctuates.

In the light receiving apparatus of another preferred embodiment, a cross sectional shape of the optical waveguiding region at a portion of the tube-type waveguide vertical to a propagating direction of light may be different from a cross sectional shape of the optical waveguiding region at another portion of the tube-type waveguide vertical to the propagating direction of light.

Because a stationary wave is converted due to propagation of light from one portion to another portion in the tube-type waveguide, a propagation mode is scrambled and the cross-section light intensity distribution at the other portion becomes uniform. The light receiving apparatus makes uniform the cross-section light intensity distribution of light from the incident end, which can be described using a similar description to that of the tube-type waveguide in which the cross sectional shape of the optical waveguiding region is polygonal.

Because light from the tube-type waveguide is connected to the light receiving device, the light receiving apparatus can obtain the same advantageous effects as the case of the tube-type waveguide in which the cross sectional shape of the optical waveguiding region is polygonal.

Therefore, the present preferred embodiment can provide a light receiving apparatus capable of stably receiving optical data even if partiality occurs in the NFP of the light emitted from an end of an optical fiber or even if the partiality of the NFP fluctuates.

Though the above fiber is described as a step-index-type fiber, where light is propagated by total reflection at the boundary between the clad and core, the same advantageous effects can be obtained by using a graded-index-type fiber, where light is propagated by meandering the light by a continuous change of refractive indexes at the boundary between the clad and core.

The present preferred embodiment can provide a light receiving apparatus capable of stably receiving optical data even if partiality occurs in the NFP of the light emitted from an end of an optical fiber or even if the partiality of the NFP fluctuates.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described below in detail by referring to the accompanying drawings. The present invention is not restricted to the preferred embodiments described below.

Preferred Embodiment 1

A preferred embodiment of the present invention provides a light receiving apparatus. The light receiving apparatus has a tube-type waveguide having an optical waveguiding region for propagating light entering an incident end and exiting an emission end of the tube-type waveguide through mirror reflection or total reflection. The cross sectional shape of the optical waveguiding region vertical to a propagating direction of light is polygonal. The light receiving apparatus also has a light receiving device connected to the emission end of the tube-type waveguide to receive the light from the tube-type waveguide.

Figure 1:
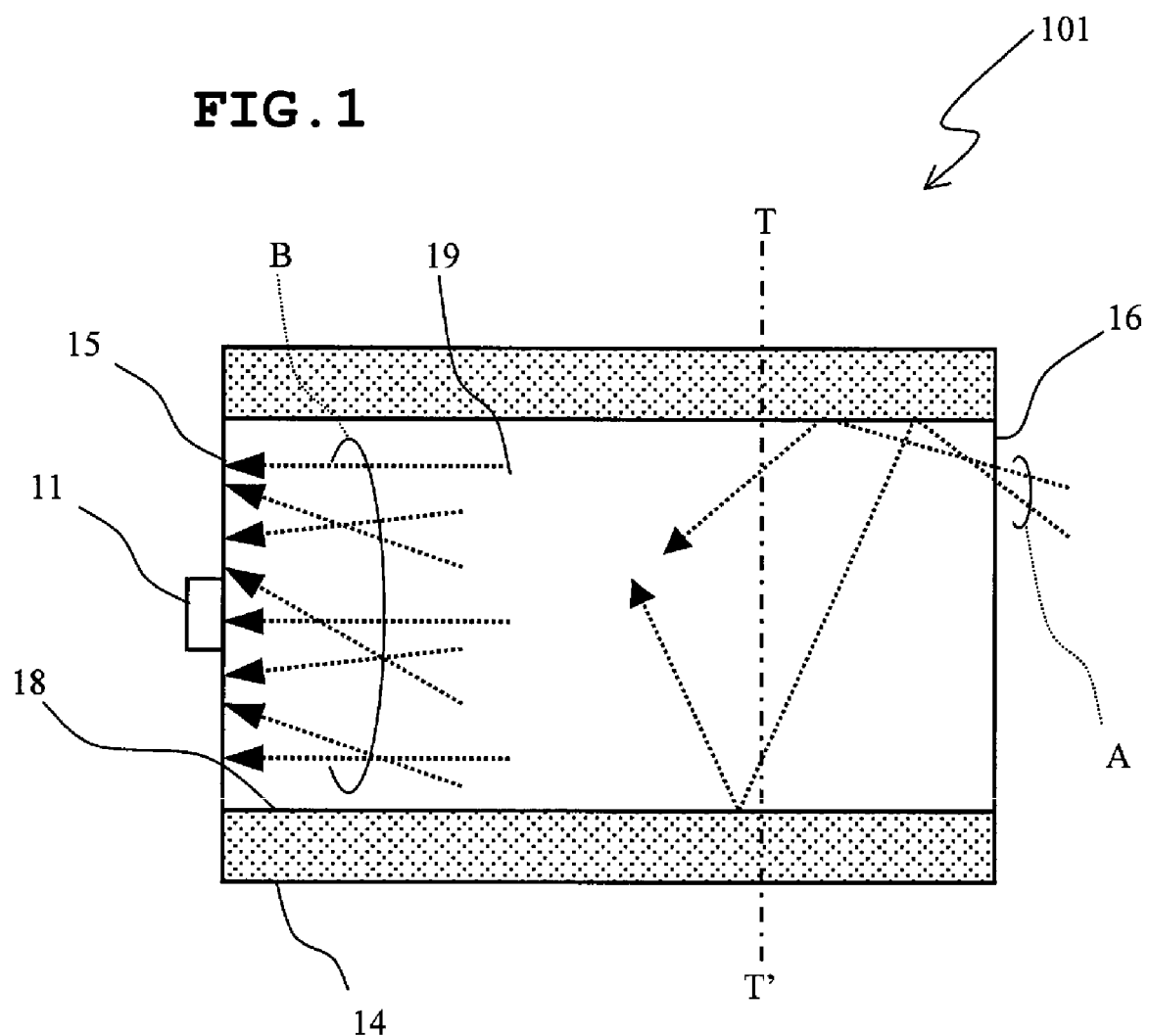
FIG. 1 is a conceptual view of a light receiving apparatus according to a preferred embodiment of the present invention.

FIG. 1 shows a conceptual view of a light receiving apparatus 101 according to a preferred embodiment of the present invention. The light receiving apparatus 101 includes a light receiving device 11 and a tube-type waveguide 14. FIG. 1 is an illustration of a cross section at a plane including the central axis of the tube-type waveguide 14. Additional components required for the light receiving device 11, including a power supply, peripheral circuits, and a substrate, are not shown in FIG. 1 and the figures following FIG. 22.

The light receiving device 11 is preferably a photoelectric device for converting light into an electrical signal. However, it is possible to use a PD as the light receiving device 11, or any other suitable device.

The tube-type waveguide 14 is preferably a hollow tube or a tube filled with resin having a high transmittance relative to the wavelengths used. At one end of the tube-type waveguide 14 is an incident end 16 through which light enters, and at the other end of the tube-type waveguide 14 is an emission end 15 through which light is emitted. The inner wall of the tube is surrounded by a reflection plane 18 for reflecting light, wherein the light repeats reflection on the reflection plane 18. The portion surrounded by the reflection plane 18 is the optical waveguiding region 19.

The reflection plane 18 can be used as a reflector for mirror-reflecting light. The light A incoming through the incident end 16 repeats mirror reflection on the reflection plane 18, propagates through the optical waveguiding region 19, and is led to the emission end 15.

The tube-type waveguide 14 may have a structure in which a medium having a high refractive index is covered with a medium having a low refractive index. Because light is totally reflected by the boundary between these media, it is possible to use the boundary as the reflection plane 18.

In the tube-type waveguide 14, the light A incoming from the incident end 16 is scrambled by repeated reflection on the reflection plane 18, thereby making uniform the NFP of the light B at the emission end 15.

Figure 2:
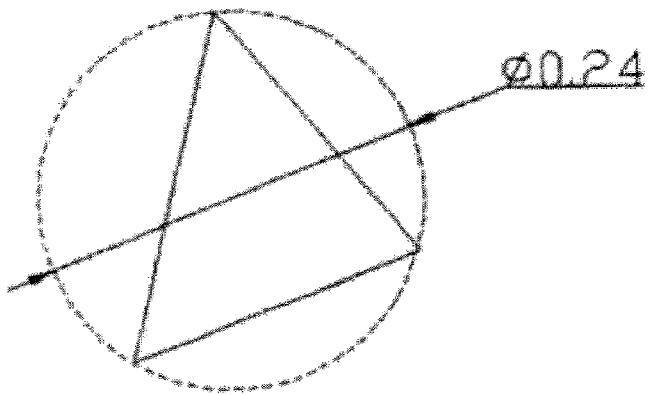
FIG. 2 is an illustration of a cross section (shape 1) of an optical waveguiding region.
Figure 3:
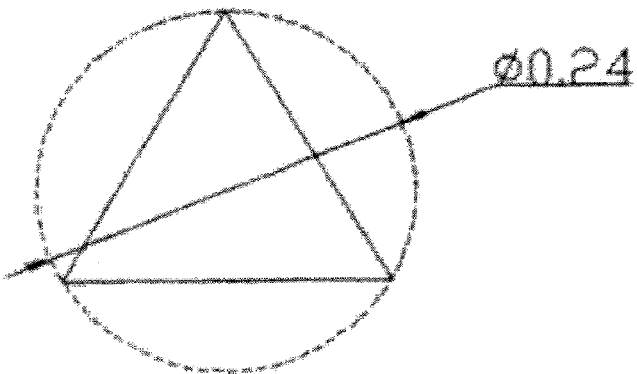
FIG. 3 is an illustration of a cross section (shape 2) of the optical waveguiding region.
Figure 4:
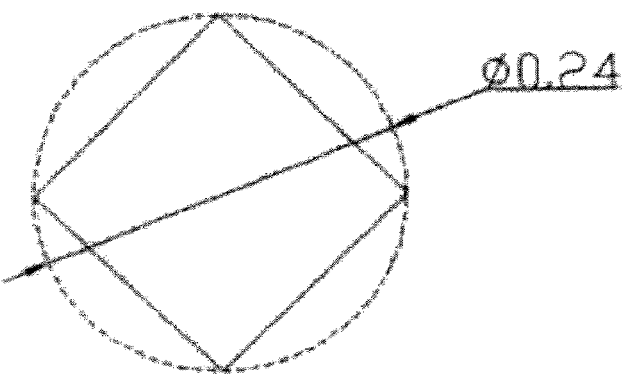
FIG. 4 is an illustration of a cross section (shape 3) of the optical waveguiding region.
Figure 5:
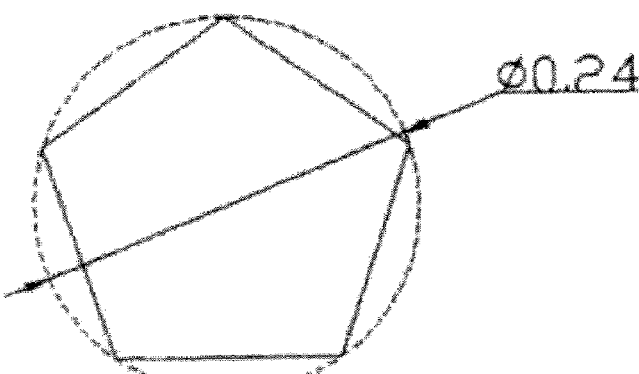
FIG. 5 is an illustration of a cross section (shape 4) of the optical waveguiding region.
Figure 6:
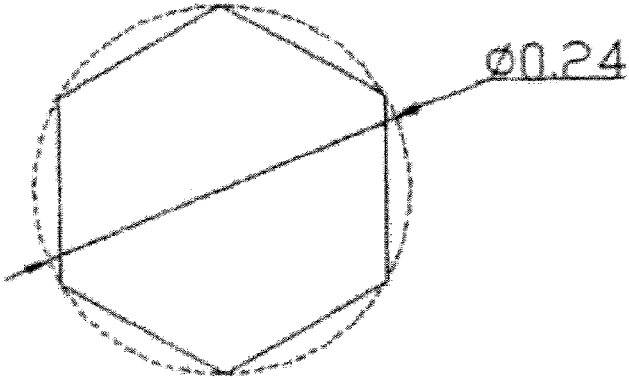
FIG. 6 is an illustration of a cross section (shape 5) of the optical waveguiding region.
Figure 7:
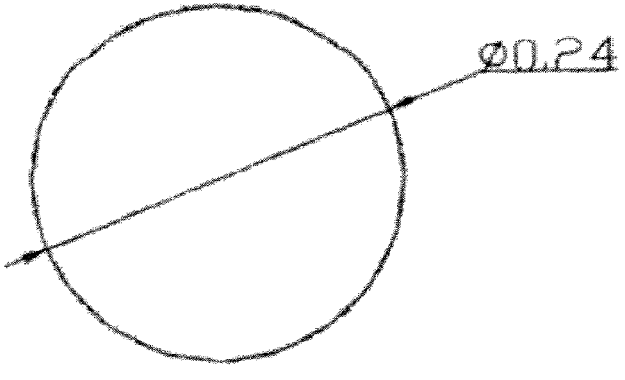
FIG. 7 is an illustration of a cross section (shape 6) of the optical waveguiding region.
Figure 8:
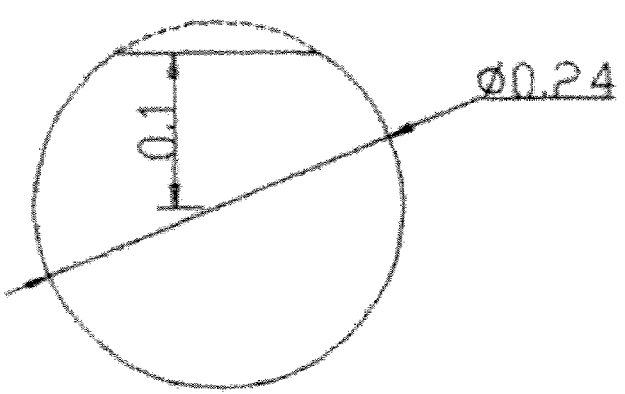
FIG. 8 is an illustration of a cross section (shape 7) of the optical waveguiding region.
Figure 9:
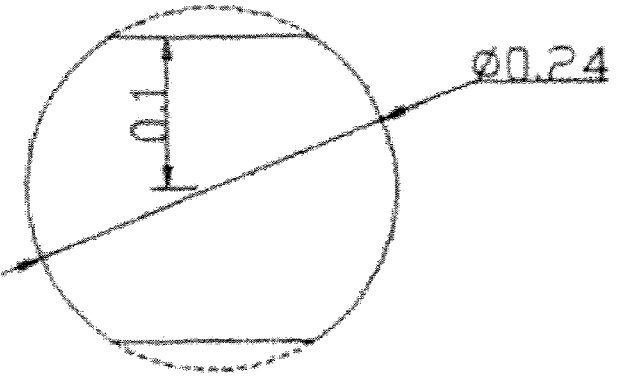
FIG. 9 is an illustration of a cross section (shape 8) of the optical waveguiding region.
Figure 10:
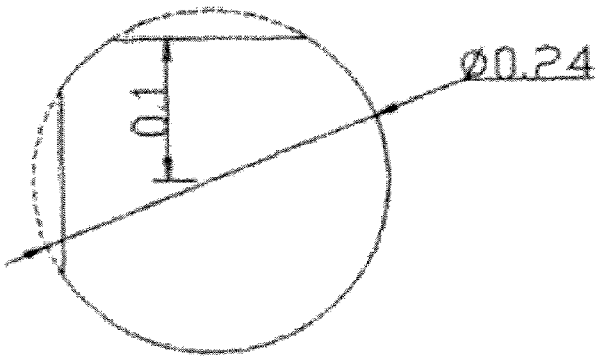
FIG. 10 is an illustration of a cross section (shape 9) of the optical waveguiding region.
Figure 11:
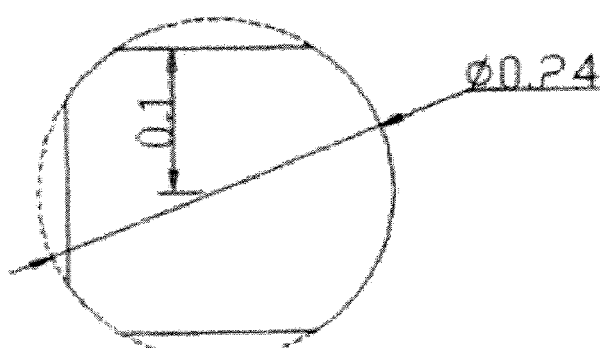
FIG. 11 is an illustration of a cross section (shape 10) of the optical waveguiding region.
Figure 21:
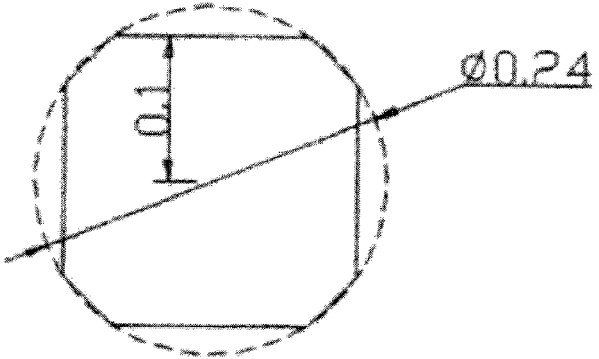
FIG. 21 is an illustration of a cross section (shape 20) of the optical waveguiding region.

FIGS. 2 to 7 and FIG. 21 show examples in which the cross sectional shape at T-T' of the optical waveguiding region 19 is polygonal. Preferably, the units are in mm. FIG. 2 shows a triangle, FIG. 3 shows an equilateral triangle, FIG. 4 shows a square, FIG. 5 shows an equilateral pentagon, FIG. 6 shows an equilateral hexagon, FIG. 7 shows an equilateral isogon, and FIG. 21 shows an octagon.

Figure 12:
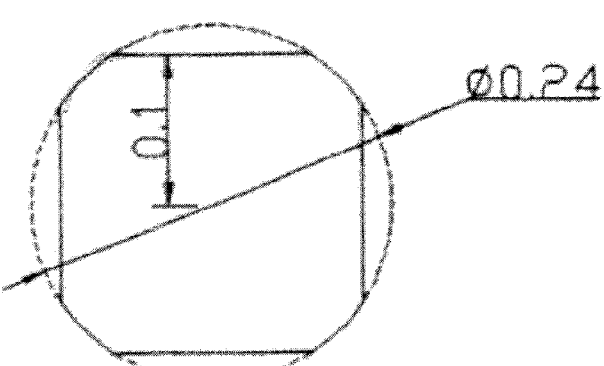
FIG. 12 is an illustration of a cross section (shape 11) of the optical waveguiding region.
Figure 13:
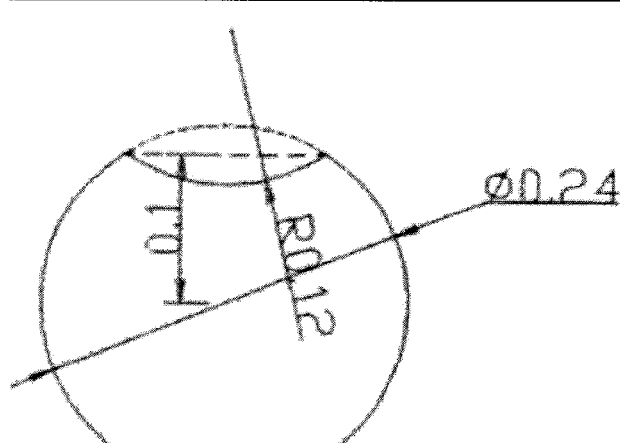
FIG. 13 is an illustration of a cross section (shape 12) of the optical waveguiding region.
Figure 14:
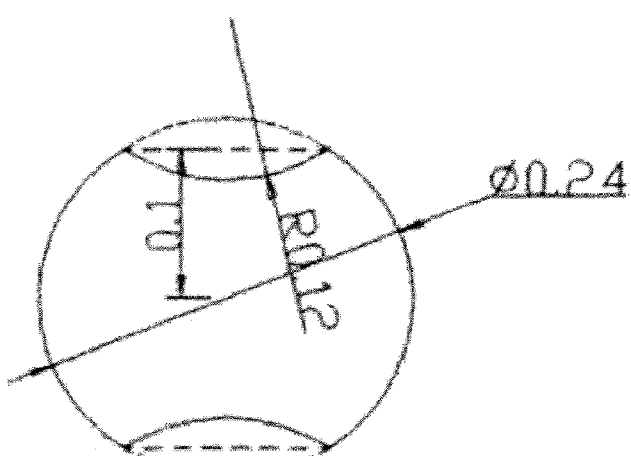
FIG. 14 is an illustration of a cross section (shape 13) of the optical waveguiding region.
Figure 15:
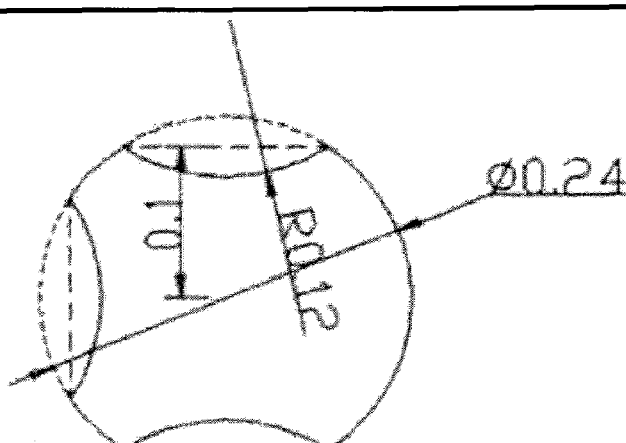
FIG. 15 is an illustration of a cross section (shape 14) of the optical waveguiding region.
Figure 16:
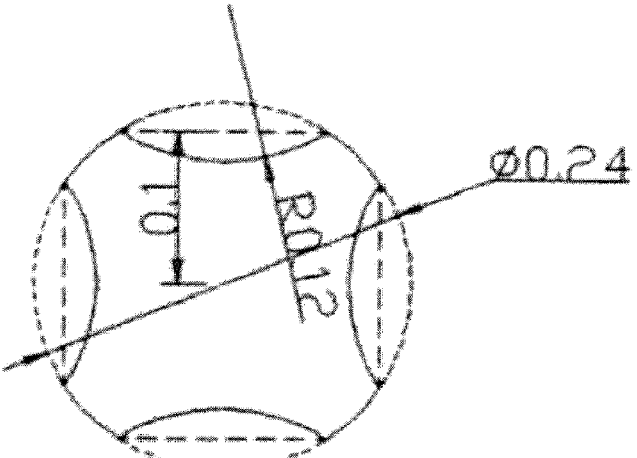
FIG. 16 is an illustration of a cross section (shape 15) of the optical waveguiding region.
Figure 17:
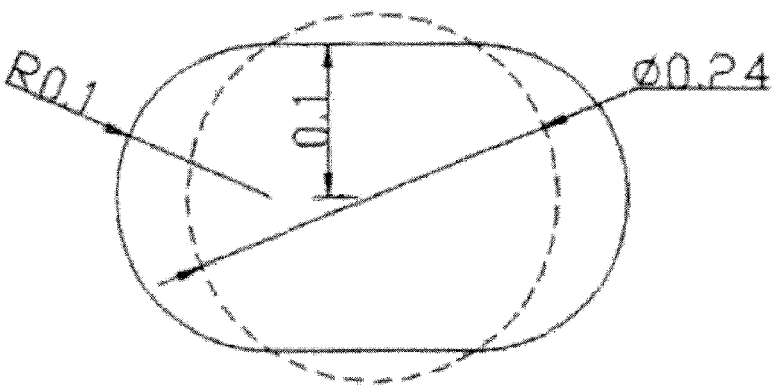
FIG. 17 is an illustration of a cross section (shape 16) of the optical waveguiding region.
Figure 18:
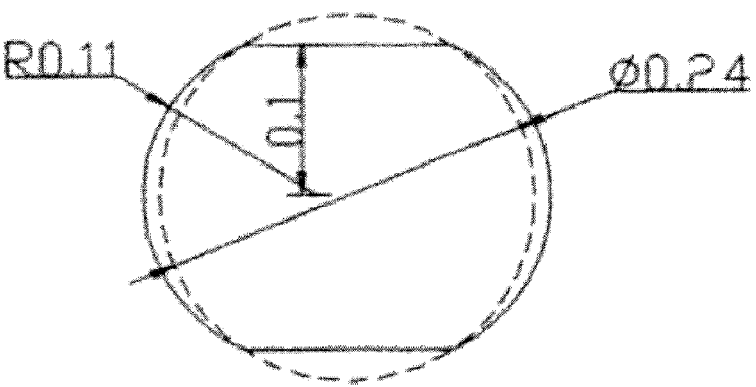
FIG. 18 is an illustration of a cross section (shape 17) of the optical waveguiding region.
Figure 19:
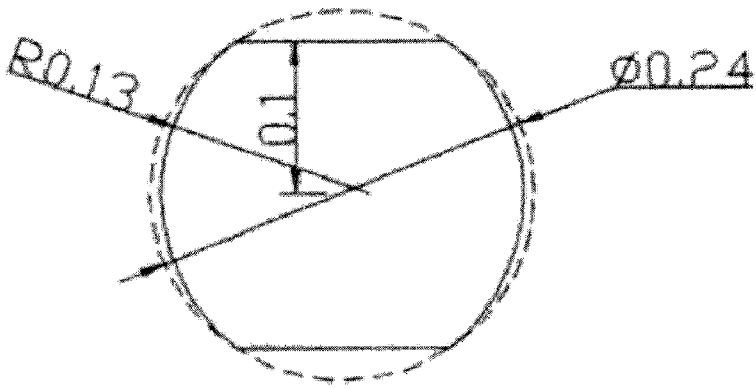
FIG. 19 is an illustration of a cross section (shape 18) of the optical waveguiding region.
Figure 20:
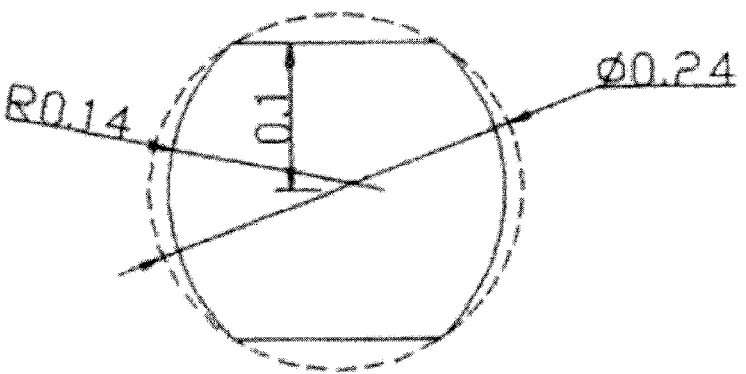
FIG. 20 is an illustration of a cross section (shape 19) of the optical waveguiding region.

The cross sectional shape of the optical waveguiding region 19 may be a rounded-corner polygon, a single closed-curve shape, a plural-curves shape, or a segmented curve shape. FIG. 12 shows a case in which the cross sectional shape of the optical waveguiding region 19 at T-T' is a rounded-corner polygon, FIGS. 13 to 16 show cases in which the cross sectional shape of the optical waveguiding region 19 at T-T' is a plural-curves shape, and FIGS. 8 to 11 and FIGS. 17 to 20 show cases in which the cross sectional shape of the optical waveguiding region 19 at T-T' is a segmented curve shape. Preferably, the units are in mm.

The rounded-corner octagon in FIG. 12 has a shape such that each apex of a square is rounded to define a substantially circular arc such that the diameter is about 0.24 mm with the intersection of the diagonal lines of the square as the center point. Because the cross section of an optical fiber is circular, it is possible that a tube-type waveguide whose sectional shape is a rounded-corner polygon can mitigate the alignment accuracy necessary between the optical fiber and the light guiding portion. Moreover, by making the apexes of a polygon round, it is possible to prevent deformation of the apex portions and thus protect the cross sectional shape.

In the light receiving apparatus 101, the light receiving device 11 is connected to and aligned with the emission end 15 of the tube-type waveguide 14. The light receiving apparatus 101 operates as follows. The light A entering the incident end 16 of the tube-type waveguide 14 is made uniform in the cross-section light intensity distribution by the tube-type waveguide 14, and exits from the emission end 15 as the light B. A portion of the light B enters the light receiving device 11 connected to the emission end 15 of the tube-type waveguide 14. In the light receiving device 11, the light B is converted into an electrical signal, and thus data to be transmitted is converted into data of an electrical signal in a transmittable form in a peripheral circuit (not shown).

Therefore, the light receiving apparatus 101 can stably receive optical data even if partiality occurs in the NFP of the light emitted from an end of the optical fiber connected to the incident end 16 of the tube-type waveguide 14 or even if the partiality of the NFP fluctuates.

Figure 22:
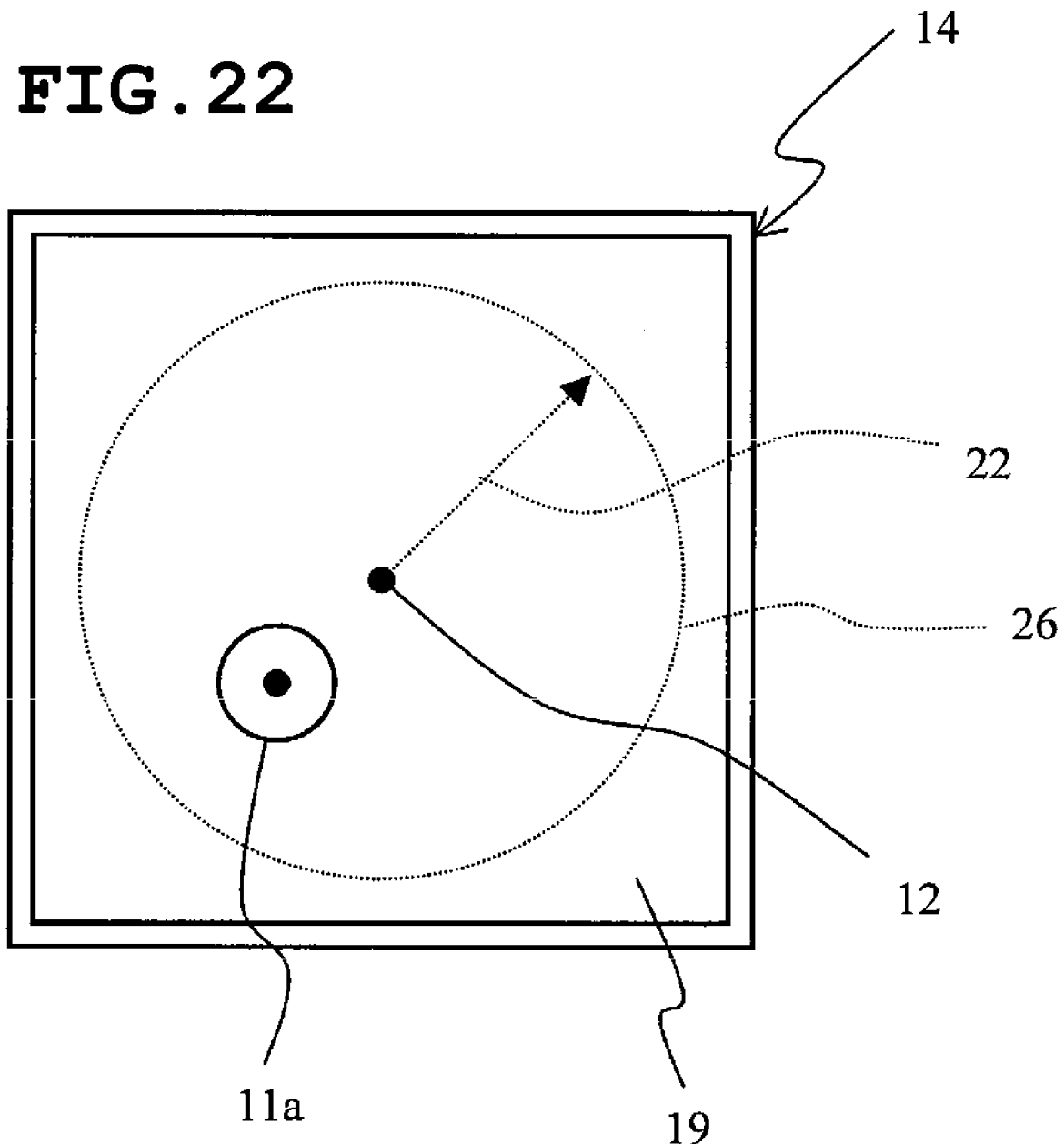
FIG. 22 is an illustration of the relative positions of the emission end of a tube-type waveguide and the light emitting plane of a light receiving apparatus.

The size of the optical waveguiding region 19 on the plane of the emission end 15 is determined to be a size taking into account an assembling error when connecting the light receiving device 11 with the tube-type waveguide 14. FIG. 22 shows the relative positions of the emission end 15 of the tube-type waveguide 14 and the light receiving plane 11a of the light receiving device 11. In FIG. 22, the same reference numerals as the reference numerals used in FIG. 1 indicate the same configuration. In FIG. 22, reference numeral 12 denotes the central point of the tube-type waveguide 14, and 22 denotes an assembling accuracy of the light receiving device 11 and the tube-type waveguide 14. In FIG. 22, reference numeral 26 denotes an area in which the center of the light receiving plane 11a of the light receiving device 11 is possibly arranged and aligned within the assembling accuracy 22.

For example, when the light receiving plane 11a of the light receiving device 11 is a circle having a diameter of about 0.1 mm and the shape of the optical waveguide 19 on the plane of the emission end 15 is a square having a side length of about 0.22 mm, then it is possible that the light receiving device 11 can receive light from the tube-type waveguide 14 even if there is an error of ±0.06 mm in assembling of the light receiving device 11 and the tube-type waveguide 14.

Therefore, the light receiving apparatus 101 can mitigate the alignment accuracy of the light receiving device 11 and the tube-type waveguide 14.

Preferred Embodiment 2

In the light receiving apparatus of the present preferred embodiment, the cross sectional shape of the optical waveguiding region at a portion of the tube-type waveguide vertical to the propagating direction of light may be different from the cross sectional shape of the optical waveguiding region at another portion of the tube-type waveguide vertical to the propagating direction of light.

Figure 23:
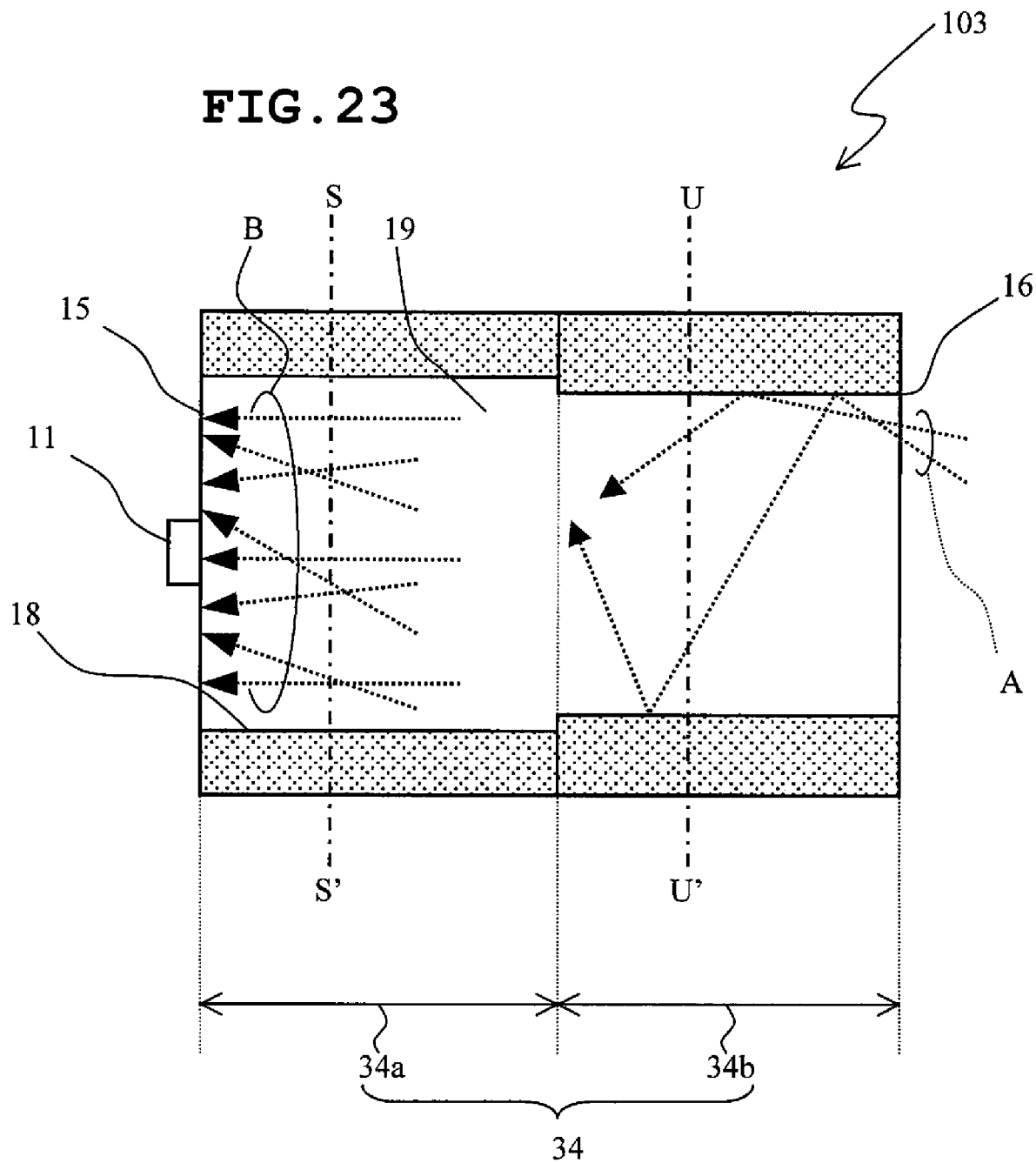
FIG. 23 is a conceptual view of a light receiving apparatus according to another preferred embodiment of the present invention.

FIG. 23 shows a conceptual view of a light receiving apparatus 103 according to another preferred embodiment of the present invention. The light receiving apparatus 103 includes the light receiving device 11 and a tube-type waveguide 34. FIG. 23 is an illustration of a cross section on a plane including the central axis of the tube-type waveguide 34. In FIG. 23, the same reference numerals as the reference numerals used in FIG. 1 indicate the same configuration and same light. The light receiving apparatus 101 in FIG. 1 is different from the light receiving apparatus 103 in that the tube-type waveguide 14 is not used but the tube-type waveguide 34 is used in the light receiving apparatus 103.

The tube-type waveguide 34 includes a tube-type waveguide 34a and tube-type waveguide 34b in which the sectional shapes of the optical waveguiding regions 19 are different from each other. For example, when the cross sectional shape of the optical waveguiding region 19 at S-S' of the tube-type waveguide 34a is as shown in FIG. 2, the cross sectional shape of the optical waveguide 19 of the tube-type waveguide 34b at U-U' can be any of the shapes in FIGS. 3 to 21.

The tube-type waveguide 34a and tube-type waveguide 34b lead the light incoming from the incident end 16 to the emission end 15 in a manner similar to the tube-type waveguide 14 shown in FIG. 1.

When an optical signal is propagated from the tube-type waveguide 34b to the tube-type waveguide 34a, a stationary wave is converted, and thus a propagation mode is scrambled thereby making uniform the cross-section light intensity distribution. Therefore, the tube-type waveguide 34 can make uniform the cross-section light intensity distribution of the light A incoming from the incident end 16 using a shorter optical wavelength than that of the tube-type waveguide 14 shown in FIG. 1.

Therefore, the light receiving apparatus 103 can obtain the same advantageous effects as those obtained by the light receiving apparatus 101 in FIG. 1.

Preferred Embodiment 3

The light receiving apparatus of the present preferred embodiment further has a multimode optical fiber for use in transmitting light into the optical waveguiding region of the tube-type waveguide from one end of the optical fiber connected to the incident end of the tube-type waveguide.

Figure 24:
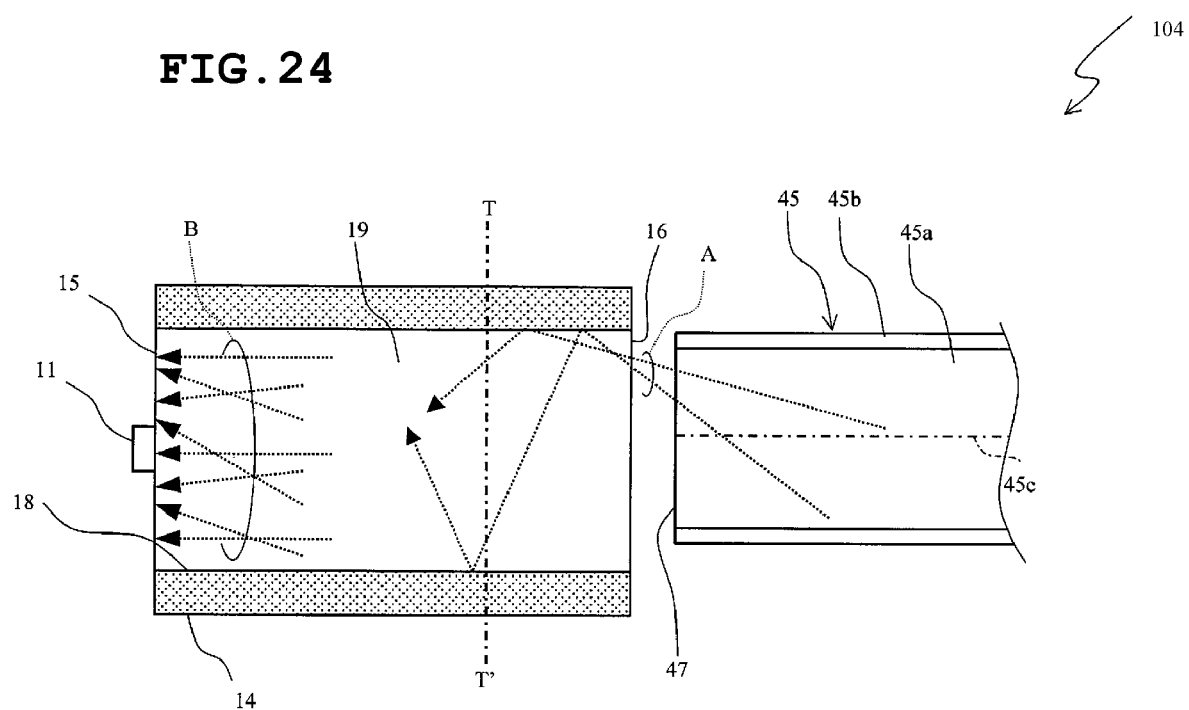
FIG. 24 is a conceptual view of a light receiving apparatus according to still another preferred embodiment of the present invention.

FIG. 24 shows a conceptual view of a light receiving apparatus 104 according to still another preferred embodiment of the present invention. The light receiving apparatus 104 includes the light receiving device 11, tube-type waveguide 14, and optical fiber 45. In FIG. 24, the same reference numerals as the reference numerals used in FIG. 1 indicate the same configuration or same light. In FIG. 24, description is made assuming that the sectional shape of the optical waveguiding region 19 of the tube-type waveguide 14 is a square.

The optical fiber 45 is a multimode optical fiber defined by a core 45a and a clad 45b. The optical fiber 45 may be a glass fiber, plastic fiber (POF), or optical fiber having a glass core and a plastic clad. The length of the optical fiber can be from about 5 mm to about 300 mm, for example.

In the light receiving apparatus 104, the incident end 16 of the tube-type waveguide 14 is connected with one end 47 of the optical fiber 45 and the light from the optical fiber 45 enters the incident end 16 of the tube-type waveguide 14 as light A. As shown in FIG. 1, the tube-type waveguide 14 emits light B having a uniform NFP through the emission end 15. Therefore, the light receiving device 11 connected with the emission end 15 can receive a sufficient quantity of light, independent of an assembling error.

Therefore, the light receiving apparatus 104 can stably receive optical data even if partiality occurs in the NFP of the light emitted from an end of the optical fiber 45 or even if the partiality of the NFP fluctuates.

It is preferable that the size of the optical waveguiding region at the plane of the incident end of the tube-type waveguide is larger than the size of the core at the plane of the one end of the optical fiber.

Figure 25:
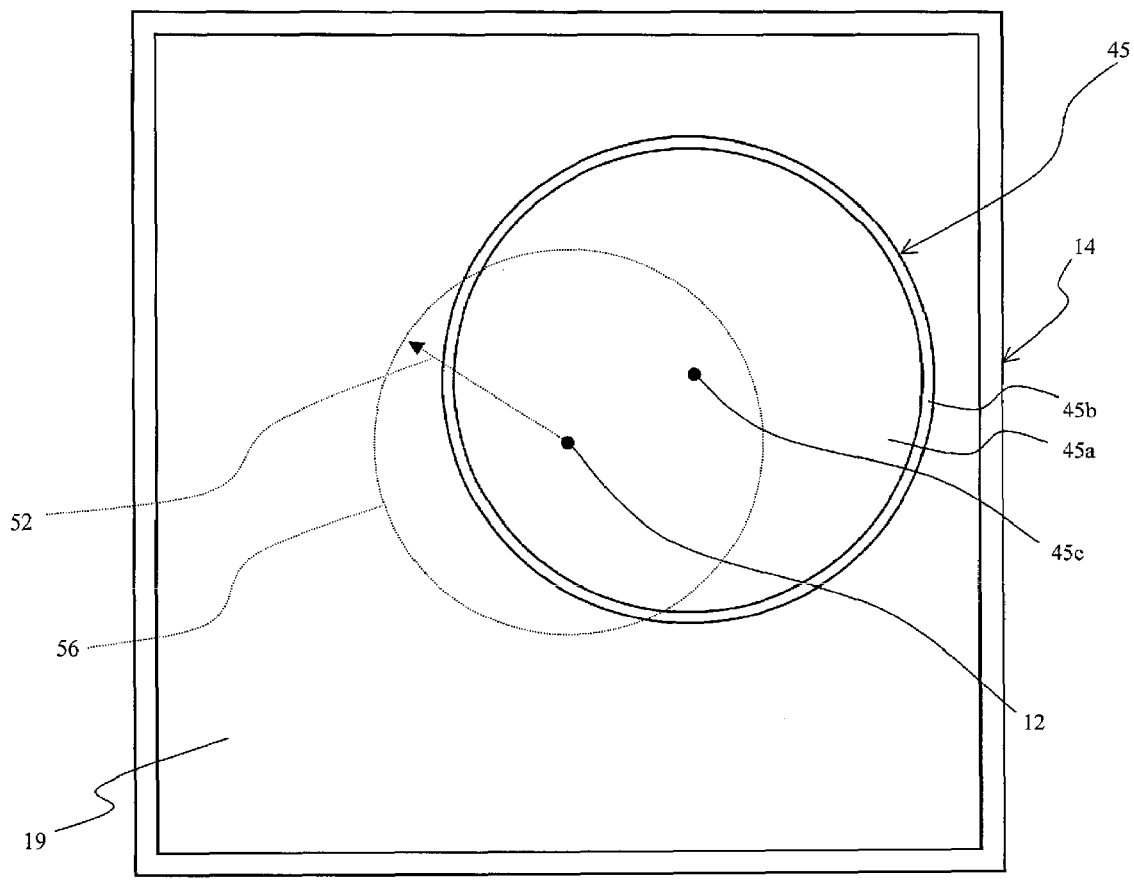
FIG. 25 is an illustration of the relative positions of an end of an optical fiber and the incident end of a tube-type waveguide.

The size of the optical waveguiding region 19 on the plane of the incident end 16 is determined to be a size taking into account an assembling accuracy when connecting the optical fiber 45 with the tube-type waveguide 14. FIG. 25 shows the relative positions of one end 47 of the optical fiber 45 and the incident end 16 of the tube-type waveguide 14. In FIG. 25, the same reference numerals as the reference numerals used in FIGS. 1, 22, and 24 indicate the same configuration and same light. Reference numeral 45c denotes the central axis of the optical fiber 45. Reference numeral 52 denotes an assembling accuracy. Reference numeral 56 denotes an area in which the central axis 45c of the optical fiber 45 is possibly arranged and aligned within the assembling accuracy 52.

For example, when the cross sectional shape of the core 45a of the optical fiber 45 is a circle having a diameter of about 0.24 mm and the shape of the optical waveguide 19 on the plane of the incident end 16 is a square having a side length of about 0.34 mm, the optical fiber 45 can connect the light A to the tube-type waveguide 14 without loss even if there is an error of ±0.05 mm in assembling the optical fiber 45 to the tube-type waveguide 14.

Therefore, the light receiving apparatus 104 can mitigate the alignment accuracy of the optical fiber 45 and the tube-type waveguide 14 and decrease a transmission loss.

Preferred Embodiment 4

In the light receiving apparatus of the present preferred embodiment, it is preferable that the area of the cross sectional shape of the optical waveguiding region of the tube-type waveguide vertical to the propagating direction of light decreases uniformly from the incident end to the emission end.

Figure 26:
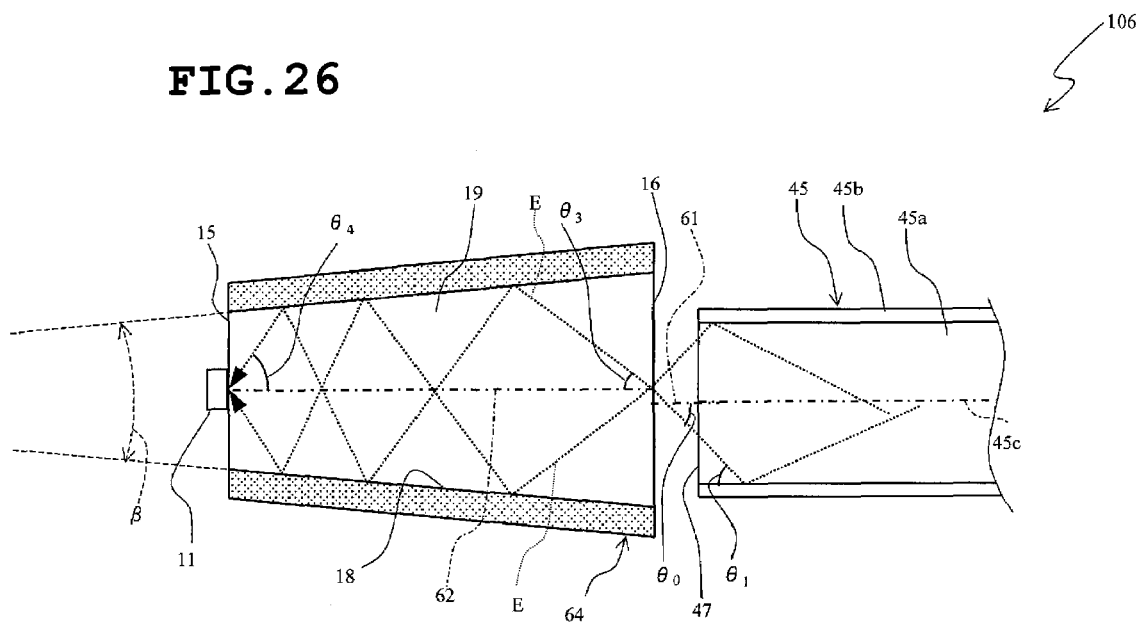
FIG. 26 is a conceptual view of a light receiving apparatus according to still another preferred embodiment of the present invention.

FIG. 26 shows a conceptual view of a light receiving apparatus 106 according to still another preferred embodiment of the present invention. The light receiving apparatus 106 includes the light receiving device 11, a tapered waveguide 64 serving as the tube-type waveguide, and optical fiber 45. FIG. 26 is an illustration of a cross section on a plane including the central axis 62 of the tapered waveguide 64 and the central axis 45c of the optical fiber 45. In FIG. 26, the same reference numerals as the reference numerals used in FIGS. 1 and 24 indicate the same configuration or same light. In FIG. 26, description is made assuming that the sectional shape of the optical waveguiding region 19 of the tapered waveguide 64 is a square.

The tapered waveguide 64 has the same configuration and the same function as the tube-type waveguide 14. The tapered waveguide 64 is different from the tube-type waveguide 14 in that the area of the cross sectional shape of the optical waveguiding region 19 decreases uniformly from the incident end 16 to the emission end 15. For example, the length from the incident end 16 of the tapered waveguide 64 up to the emission end 15 can be about 3 mm.

In the light receiving apparatus 106, the tapered waveguide 64 and the optical fiber 45 are connected so that the central axis 62 and the central axis 45c are parallel.

It is possible to show the reduction rate of the area of the cross sectional shape of the optical waveguiding region 19 to the distance of the central axis 62 by a taper angle β. The taper angle β is an angle formed by two tangent lines of the intersection points between the intersection lines formed by the above cross section and the reflection plane 18 and any cross section of the tapered waveguide 64, the tangent lines being on the above cross section of the reflection plane 18. The taper angle β of the tapered waveguide 64 is the same from the incident end 16 to emission end 15.

Moreover, to decrease a transmission loss, it is preferable to set the taper angle β of the tapered waveguide 64 within the range described below so that all of the light A can be propagated to the emission end 15.

It is assumed that the refractive index of the optical waveguiding region 19 is $n_3$, the refractive index of the core 45a of the optical fiber 45 is $n_1$, the refractive index of the clad 45b of the optical fiber 45 is $n_2$, and the external refractive index of the light receiving apparatus 106 is $n_0$. In FIG. 26, a parallel line 61 denotes a virtual parallel line that is parallel with the central lines 62 and 45c.

In FIG. 26, it is assumed that the light incoming at the maximum angle from the central axis 62 among the light A incoming from the optical fiber 45 is E. Angle $\theta_1$ is an angle at which the light E is incident on the boundary between the core 45a and the clad 45b in the core 45a. Angle $\theta_0$ is the angle of the light E relative to the parallel line 61 formed during the time between emission of the light E from one end 47 of the optical fiber 45 and entrance of the light E into the incident end 16 of the tapered waveguide 64. Angle $\theta_3$ is an angle of the light E relative to the central line 62 in the tapered waveguide 64, and angle $\theta_4$ is an angle of the traveling direction of the light E repeating reflection on the reflection plane 18 relative to the central axis 18.

Assuming k as the number of times of reflection of the light E between the incident end 16 and the emission end 15 in the tapered waveguide 64, there is the relation shown by Numerical Formula 1 between angle $\theta_3$, k, angle $\theta_4$, and taper angle β.

$$\theta_4 = (k - \tfrac{1}{2})\beta + \theta_3 + \beta/2 \quad \text{Numerical Formula 1}$$

Because there is the relation of Numerical Formula 1, the angle $\theta_4$ increases as the taper angle β increases or as a certain number k of times of reflection increases, and the angle $\theta_4$ exceeds 90° when the taper angle β exceeds a certain angle or when a certain number k of times of reflection is exceeded, resulting in the light E returning to the incident end 16. Therefore, it is necessary to keep the angle $\theta_4$ in the range of Numerical Formula 2 so that the light E does not return to the incident end 16 due to reflection in the tapered waveguide 64.

$$\theta_4 < 90° \quad \text{Numerical Formula 2}$$

Moreover, because the light E emitted from the optical fiber 45 is totally reflected on the boundary between the core 45a and the clad 45b, the angle $\theta_1$ is equal to or less than the critical angle θc defined by Numerical Formula 3.

$$\theta_1 \leq \theta c = \cos^{-1}(n_2/n_1) \quad \text{Numerical Formula 3}$$

Furthermore, the angles $\theta_1$ and $\theta_0$ have the relation of Numerical Formula 4.

$$n_0 \sin\theta_0 = n_1 \sin\theta_1 \quad \text{Numerical Formula 4}$$

Furthermore, the angles $\theta_3$ and $\theta_0$ have the relation of Numerical Formula 5.

$$n_0 \sin\theta_0 = n_3 \sin\theta_3 \quad \text{Numerical Formula 5}$$

To emit the light E from the emission end 15 of the tapered waveguide 64 in accordance with the relations of Numerical Formulas 1 to 5, it is preferable to design the taper angle β to a value smaller than the value calculated using Numerical Formula 6.

$$\beta = 1/k \{\theta_4 - \sin^{-1}(n_1/n_3 \times \sin\theta_1)\} \quad \text{Numerical Formula 6}$$

Therefore, the tapered waveguide 64 can connect the light A from the optical fiber 45 to the light receiving device 11 by concentrating and making the cross-section light intensity distribution for the emission end 15 uniform. Therefore, the light receiving apparatus 106 can stably receive optical data even if partiality occurs in the NFP of the light emitted from an end of the optical fiber or even if the partiality of the NFP fluctuates.

Preferred Embodiment 5

In the light receiving apparatus of the present preferred embodiment, it is preferable that the reduction rate of the area of the optical waveguiding region of the tube-type waveguide at a cross section vertical to the propagating direction of light to the distance in the propagating direction of light is decreased from the incident end toward the output end.

Figure 27:
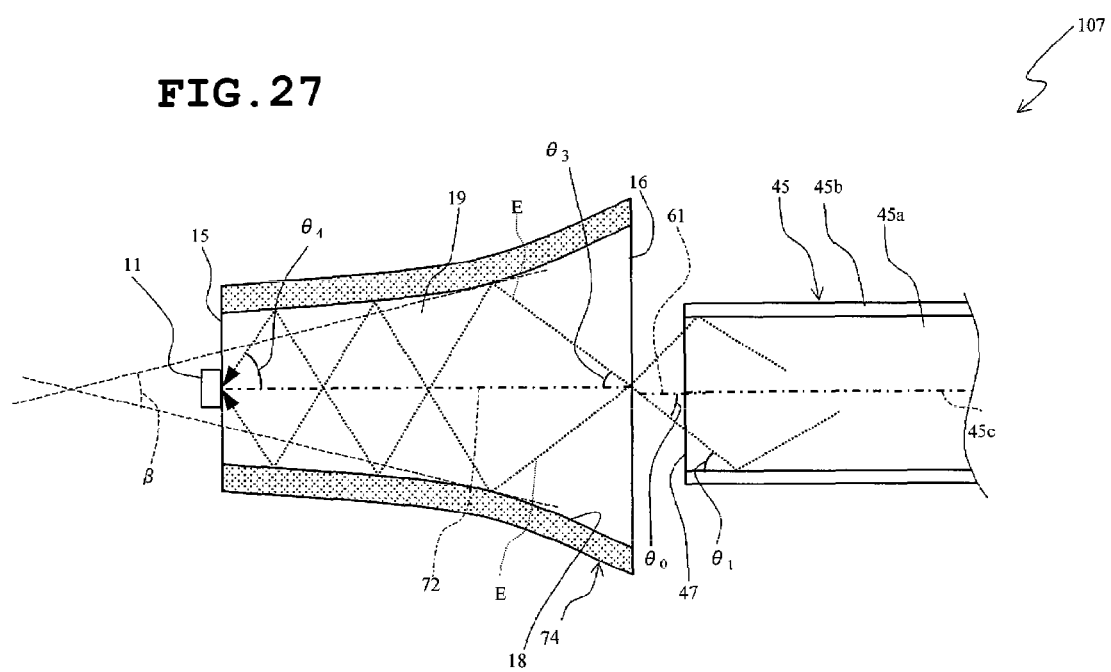
FIG. 27 is a conceptual view of a light receiving apparatus according to still another preferred embodiment of the present invention.

FIG. 27 shows a conceptual view of a light receiving apparatus 107 according to still another preferred embodiment of the present invention. The light receiving apparatus 107 includes the light receiving device 11, a tapered waveguide 74 serving as a tube-type waveguide, and the optical fiber 45. FIG. 27 is an illustration of a cross section on a plane including the central axis 72 of the tapered waveguide 74 and the central axis 45c of the optical fiber 45. In FIG. 27, the same reference numerals as the reference numerals used in FIGS. 1, 24, and 26 indicate the same configuration or same light. In FIG. 27, description is made assuming that the cross sectional shape of the optical waveguiding region 19 of the tube-type waveguide 74 is a square.

The tube-type waveguide 74 has the same configuration and the same function as the tapered waveguide 64. The tube-type waveguide 74 is different from the tapered waveguide 64 in that the reduction rate in which the cross sectional shape of the light waveguiding region 19 is uniformly decreased from the incident end 16 toward the emission end 15 is decreased from the incident end 16 toward the emission end 15.

In the tube-type waveguide 74, the taper angle β is decreased from the incident end 16 to the emission end 15. Therefore, even if the taper angle β is large and the number k of times of reflection is large near the incident end 16, the light E does not return to the incident end 16 because the angle $\theta_4$ does not exceed 90°.

Therefore, the light receiving apparatus 107 can stably receive optical data even if partiality occurs in the NFP of the light emitted from an end of an optical fiber or even if the partiality of the NFP fluctuates.

Simulation Result 1

Figure 28:
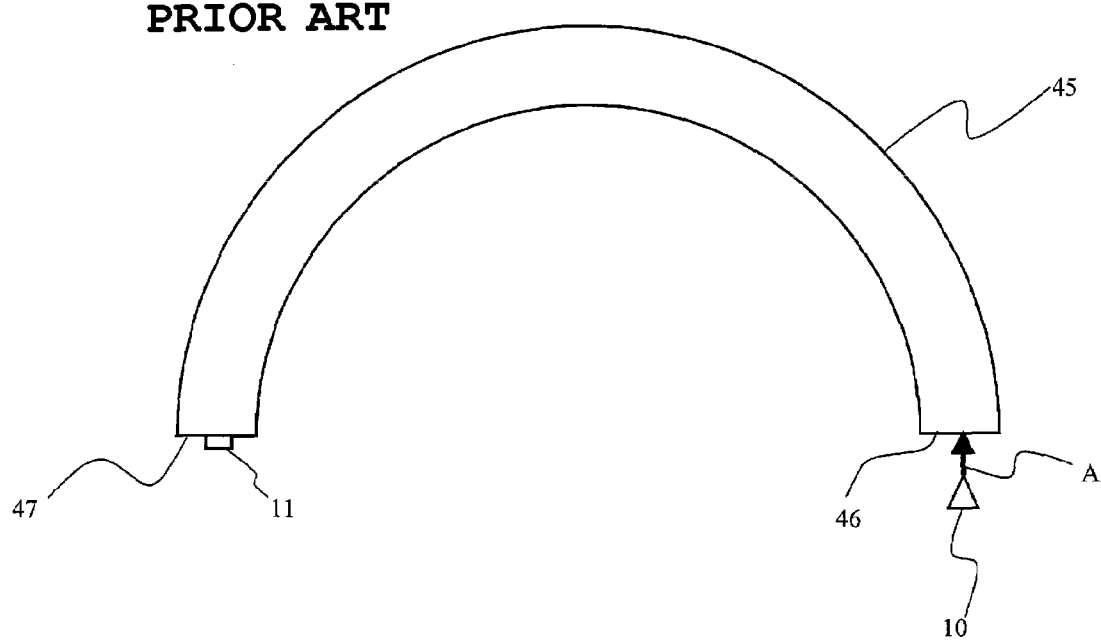
FIG. 28 is a conceptual view of a conventional light receiving apparatus for simulation purposes.
Figure 29:
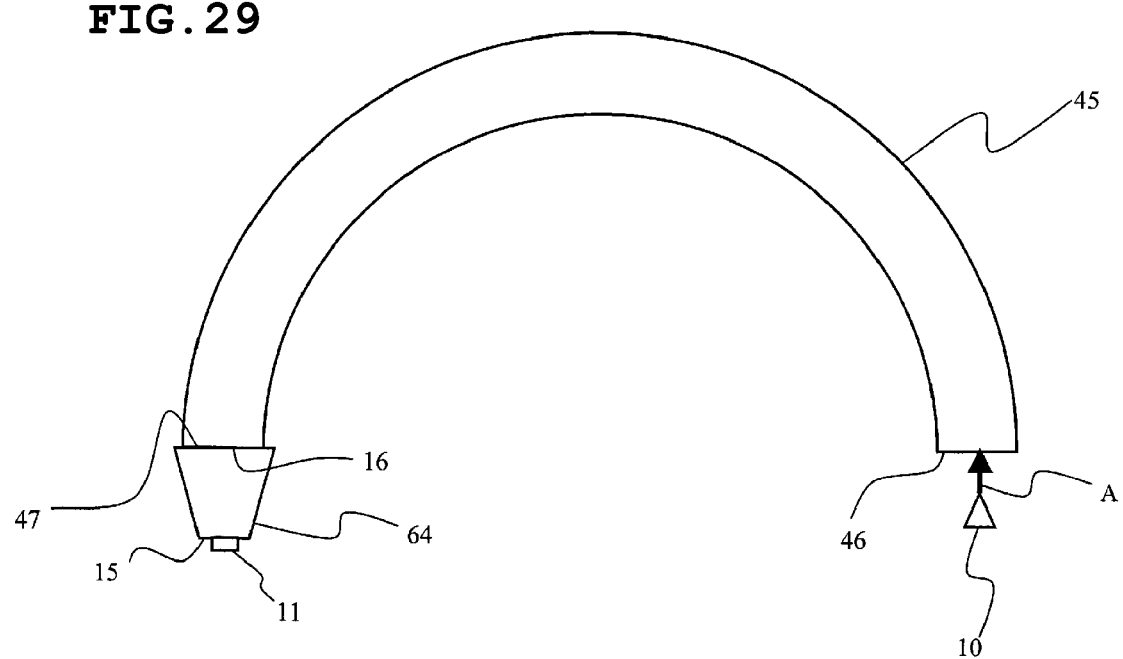
FIG. 29 is a conceptual view of a light receiving apparatus according to a preferred embodiment of the present invention for simulation purposes.

The effect of a preferred embodiment is described in more detail by showing a simulation result of the advantageous effects of the tapered waveguide 64 of the light receiving apparatus 106 in FIG. 26. FIG. 28 shows an illustration of a conventional case in which the tapered waveguide 64 is not connected to one end 47 of the optical fiber 45, and FIG. 29 shows a case of the present preferred embodiment in which the tapered waveguide 64 is connected to one end 47 of the optical fiber 45. In FIGS. 28 and 29, the same reference numerals as the reference numerals used in FIGS. 1, 22, 24, and 26 indicate the same configuration or same light. The light A enters the other end 46 of the optical fiber 45 from a light emitting device 10.

A simulation condition is shown below. The light receiving plane of the light receiving device 11 is a circle having a diameter of about 0.1 mm. The plane of the light waveguiding region 19 at the emission end 15 of the tapered waveguide 64 is a square having a side length of about 0.22 mm. The optical path length of the tapered waveguide 64 is about 3 mm. In the optical fiber 45, the diameter of the core is about 0.24 mm, the diameter up to the surface of the clad covering the core is about 0.25 mm, and the optical path length from one end 47 to the other end 46 is about 1 cm. To bend the optical fiber 45, the optical fiber 45 is uniformly bent so as to conform to a circle having a radius of about 5 mm from one end 47 of the optical fiber 45 to the other end 46. FIGS. 28 and 29 show schematic views of simulation conditions.

The central axis direction of the optical fiber 45 is the Z direction and the direction in which light is propagated from one end 47 to the other end 46 is the positive direction of Z. Moreover, in a cross section vertical to the Z direction of the optical fiber 45 (hereinafter, "the cross section vertical to the Z direction of the optical fiber" will be briefly referred to as "cross section"), it is defined that the direction vertical to the X direction and the Z direction on the cross section is the Y direction, and the direction from the far side to the near side in FIGS. 28 and 29 is defined as the positive direction of Y.

Even if the light emitting device 10 and optical fiber 45 are aligned, the central axis of the optical fiber 45 may be different from the optical axis position of the light A. An assembling error between the light emitting device 10 and the optical fiber 45 is simulated as shown below.

Figure 30:
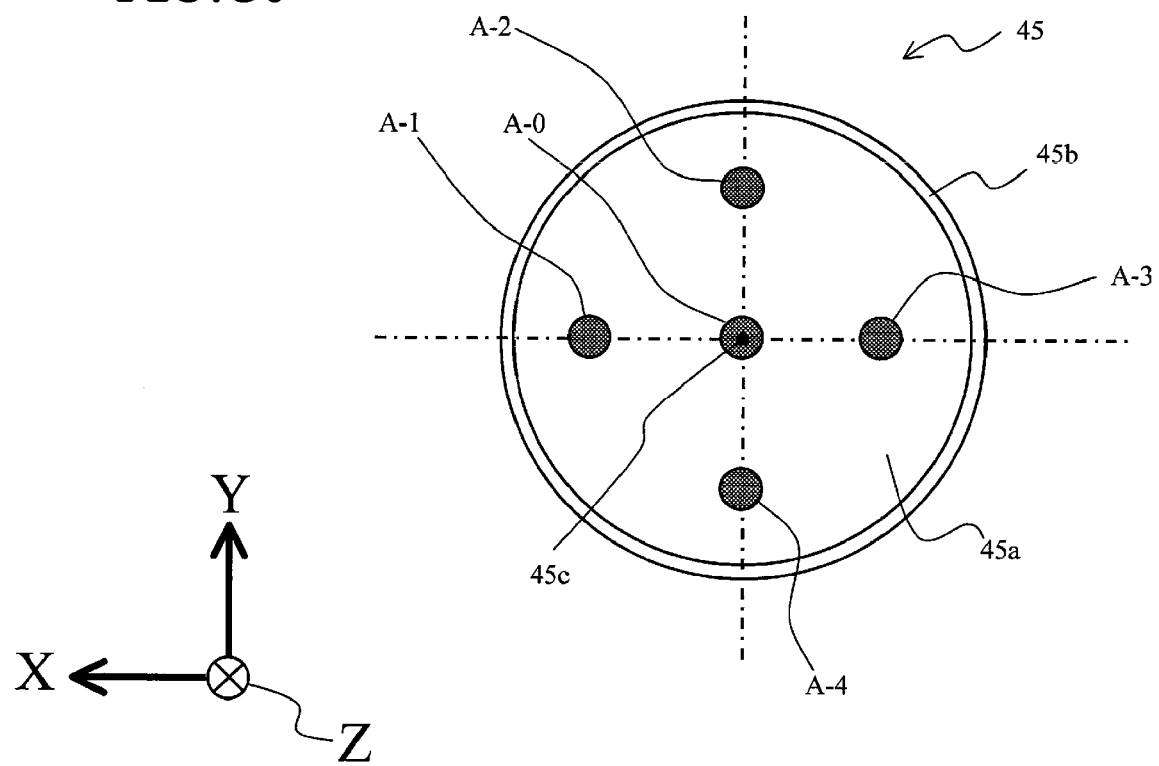
FIG. 30 is an illustration showing the optical axis position of light at the other end of the optical fiber.

FIG. 30 shows optical axis positions A-0 to A-4 of the light A entering the other end 46 of the optical fiber 45. FIG. 30 is an illustration on the plane of the other end 46 of the optical fiber 45. In FIG. 30, the same reference numerals as the reference numerals used in FIGS. 1, 22, 24, and 26 indicate the same configuration or same light. It is assumed that the central axis 45c of the optical fiber 45 is the origin (0, 0), the direction from the other end 46 of the central axis 45c to one end 47 is the positive direction of Z, the direction from bottom to top in FIG. 30 is the positive direction of Y, and the direction from right to left is the positive direction of X.

A state in which there is no assembling error between the light emitting device 10 and the optical fiber 45 is simulated by assuming that the light A comes in from the optical-axis position A-0 on the coordinates (0, 0). A state in which there is an assembling error between the light emitting device 10 and the optical fiber 45 is simulated by assuming that the light A comes in from the optical axis position A-1 on the coordinates (0.1, 0), optical axis position A-2 on the coordinates (0, 0.1), optical axis position A-3 on the coordinates (−0.1, 0), and optical axis position A-4 of the coordinates (0,−0.1). The standard unit is mm.

In the case of FIG. 28, FIGS. 31, 32, 33, and 34 respectively show a result of simulating NFP at one end 47 of the light A incoming to the optical axis positions A-0, A-1, A-3, and A-4 of the other end 46 of the optical fiber 45. FIGS. 35, 36, 37, and 38 respectively show a result of simulating the NFP at the emission end 15 when the light A incoming to optical axis positions A-0, A-1, A-3, and A-4 at the other end 46 of the optical fiber 45 is connected to the tapered waveguide 64 and the NFP at the emission end 15 in FIG. 29. In the simulation results in FIGS. 30 to 38, the light intensity of NFP is shown by color hue and it is shown that the light intensity becomes stronger from brown to white.

Figure 31:
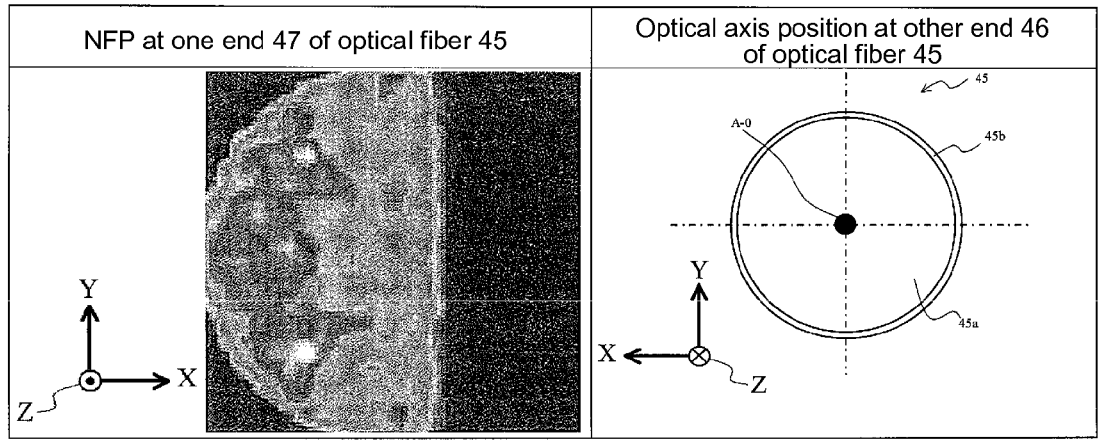
FIG. 31 is an illustration showing a result of simulating the NFP of the light at one end of the optical fiber.

FIG. 31 shows a simulation result when the light A comes in from the optical axis position A-0. The light A becomes partial in the negative direction of X because the optical fiber 45 is bent, and the NFP at one end 47 becomes stronger in light intensity in the negative direction of X.

Figure 32:
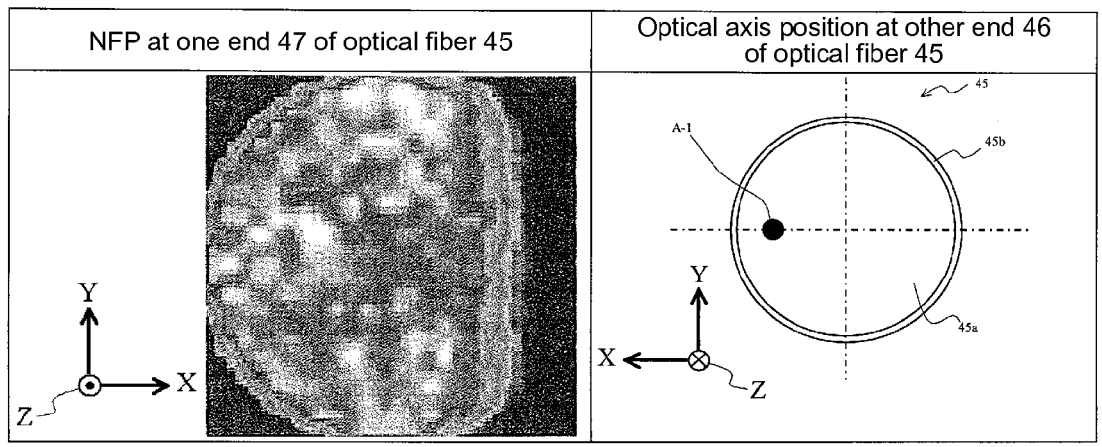
FIG. 32 is an illustration showing a result of simulating the NFP of the light at one end of the optical fiber.

FIG. 32 shows a simulation result when the light A comes in from the optical axis position A-1. The light A is diffused in the negative direction of X because the optical fiber 45 is bent and partiality of the NFP at one end 47 is mitigated.

Figure 33:
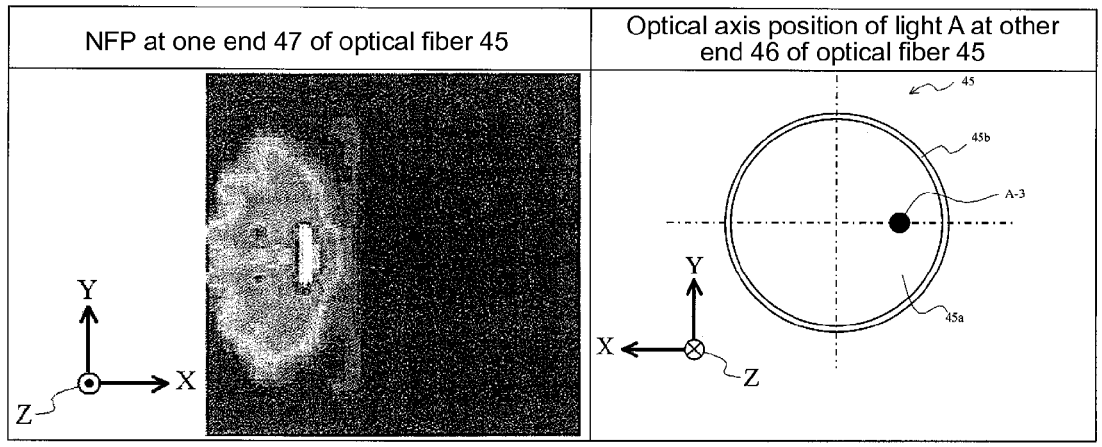
FIG. 33 is an illustration showing a result of simulating the NFP of the light at one end of the optical fiber.

FIG. 33 shows a simulation result when the light A comes in from the optical axis position A-3. The light A becomes further partial in the negative direction of X because the optical fiber 45 is bent, and the NFP at one end 47 becomes partial in a great degree in the negative direction of X.

Figure 34:
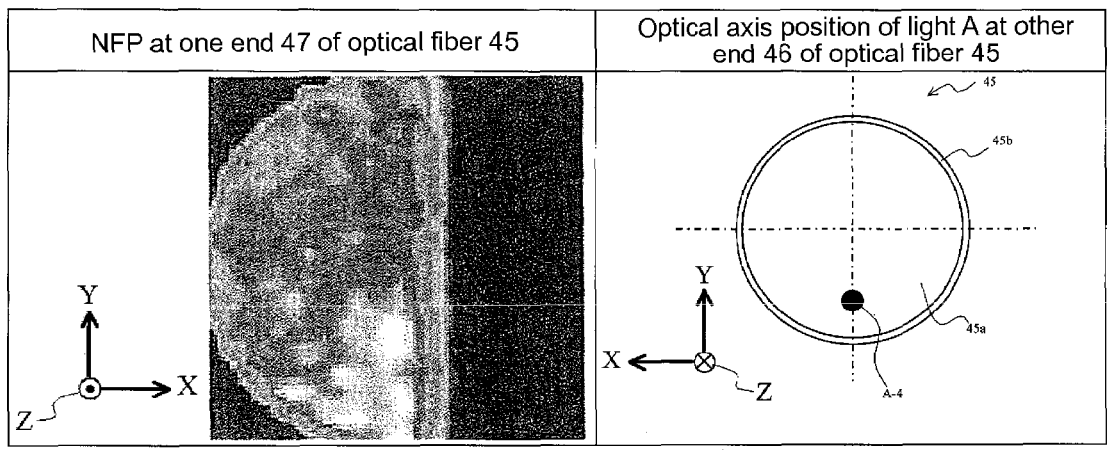
FIG. 34 is an illustration showing a result of simulating the NFP of the light at one end of the optical fiber.
Figure 35:
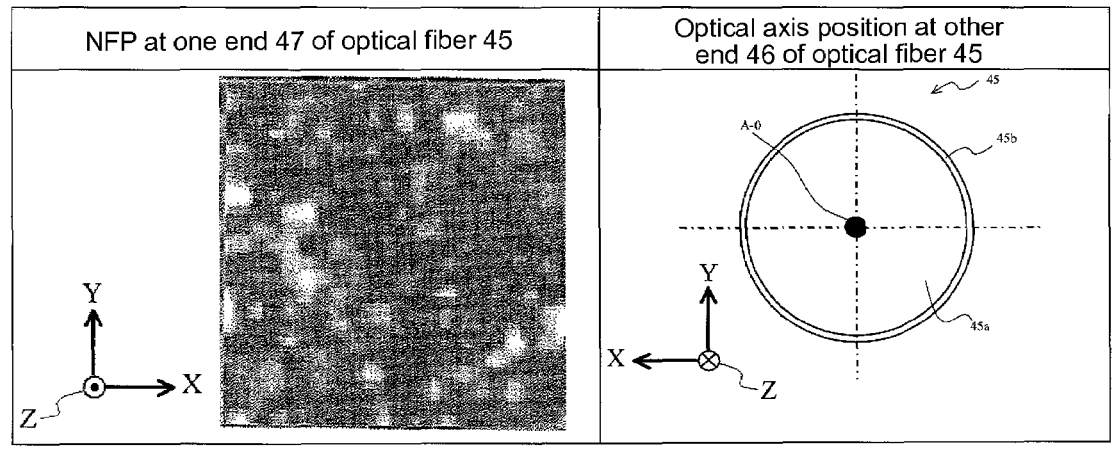
FIG. 35 is an illustration showing a result of simulating the NFP of light at the emission end of a taper-type waveguide.
Figure 36:
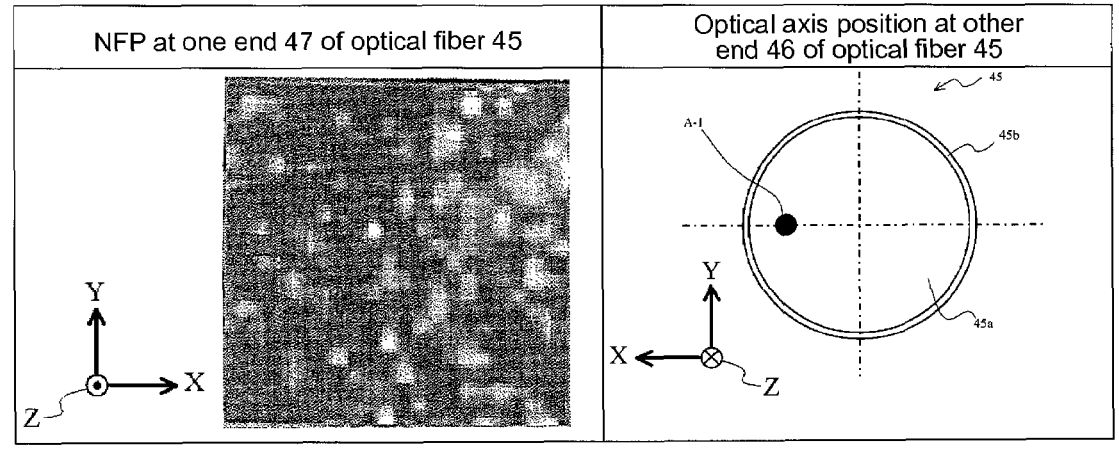
FIG. 36 is an illustration showing a result of simulating the NFP of light at the emission end of the taper-type waveguide.
Figure 37:
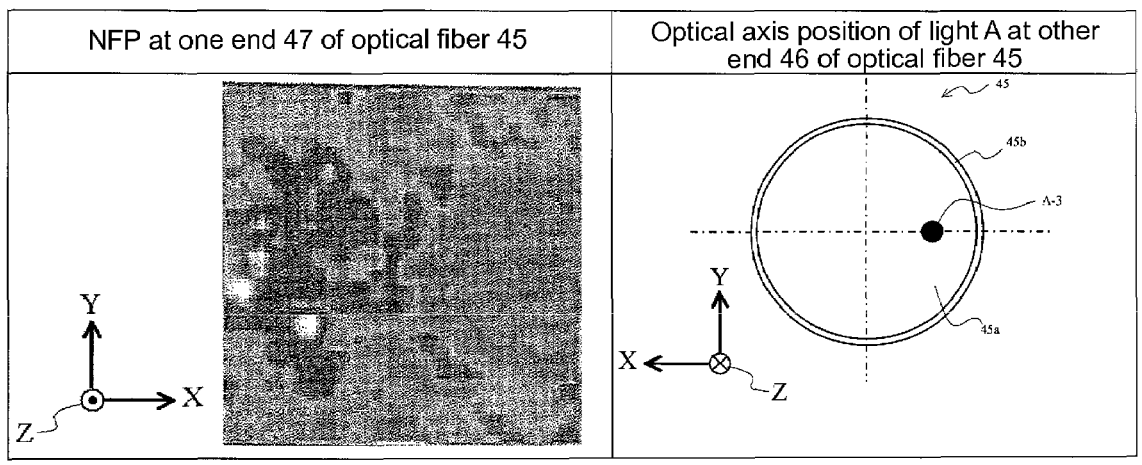
FIG. 37 is an illustration showing a result of simulating the NFP of light at the emission end of the taper-type waveguide.
Figure 38:
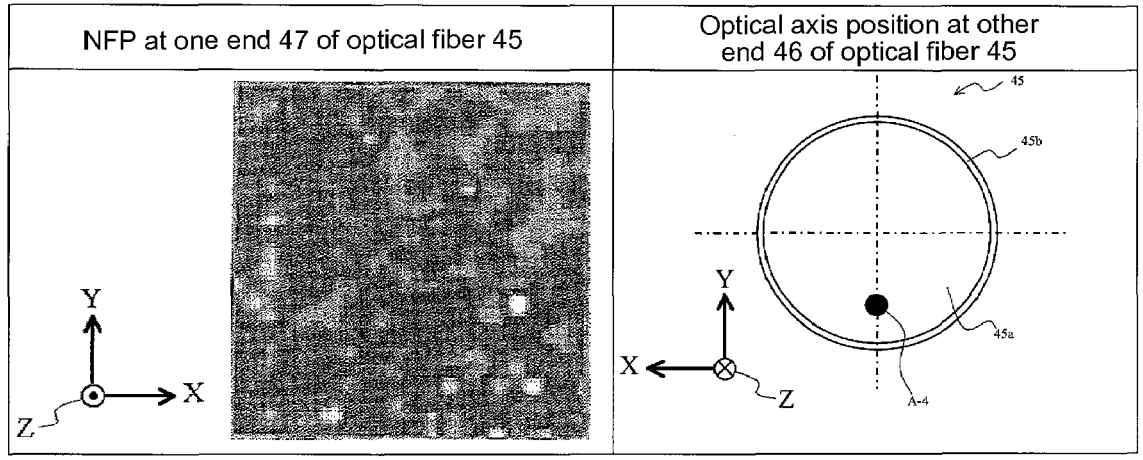
FIG. 38 is an illustration showing a result of simulating the NFP of light at the emission end of the tapered waveguide.

FIG. 34 shows a simulation result when the light A comes in from the optical axis position A-4. Similarly to the reason described for FIG. 31, the NFP at one end 47 becomes stronger in light intensity in the negative direction of X. Because the light A comes in from the negative position of Y, the NFP at one end 47 also becomes stronger in light intensity in the negative direction of Y.

Therefore, the NFP at one end 47 of the optical fiber 45 is greatly influenced by the bending of the optical fiber 45 and the optical axis position of the light A at the other end 46.

Particularly, when the light A directly enters the optical axis positions A-0, A-3, and A-4, the light quantity from a position in the positive direction of X is small at one end 47 of the optical fiber 45, as shown in FIGS. 31, 33, and 34, and the light receiving device 11 may not be able to receive a sufficient quantity of light.

However, FIGS. 35 to 38 show simulation results of the NFP of the light A at the emission end 15 of the tapered waveguide 64. As a result of comparing FIG. 31 with FIG. 35, FIG. 32 with FIG. 36, FIG. 33 with FIG. 37, and FIG. 34 with FIG. 38 in which the incident positions of the light A are equal, the light A mitigates the partiality of the NFP caused at one end 47 of the optical fiber 45 independently of the optical axis position of the light A.

Therefore, the tapered waveguide 64 can decrease the influence of the light B on the NFP due to an assembling error between the light emitting device 10 and the optical fiber 45.

Simulation Result 2

FIGS. 28 and 29 show simulation results of light quantity which can be received by the light receiving device.

In FIG. 28, the light receiving device 11 is connected to one end 47 of the optical fiber 45. In FIG. 29, the light receiving device 11 is connected to the emission end 15 of the tapered waveguide 64.

Even if the light receiving device is aligned with an optical fiber similarly to the relation between the light receiving device and the optical fiber, the central axis of the optical fiber may be different from the central position of the light receiving plane 11a of the light receiving device. An assembling error between the light receiving device 11 and the optical fiber 45 or tapered waveguide 64 is simulated as shown below.

Figure 39:
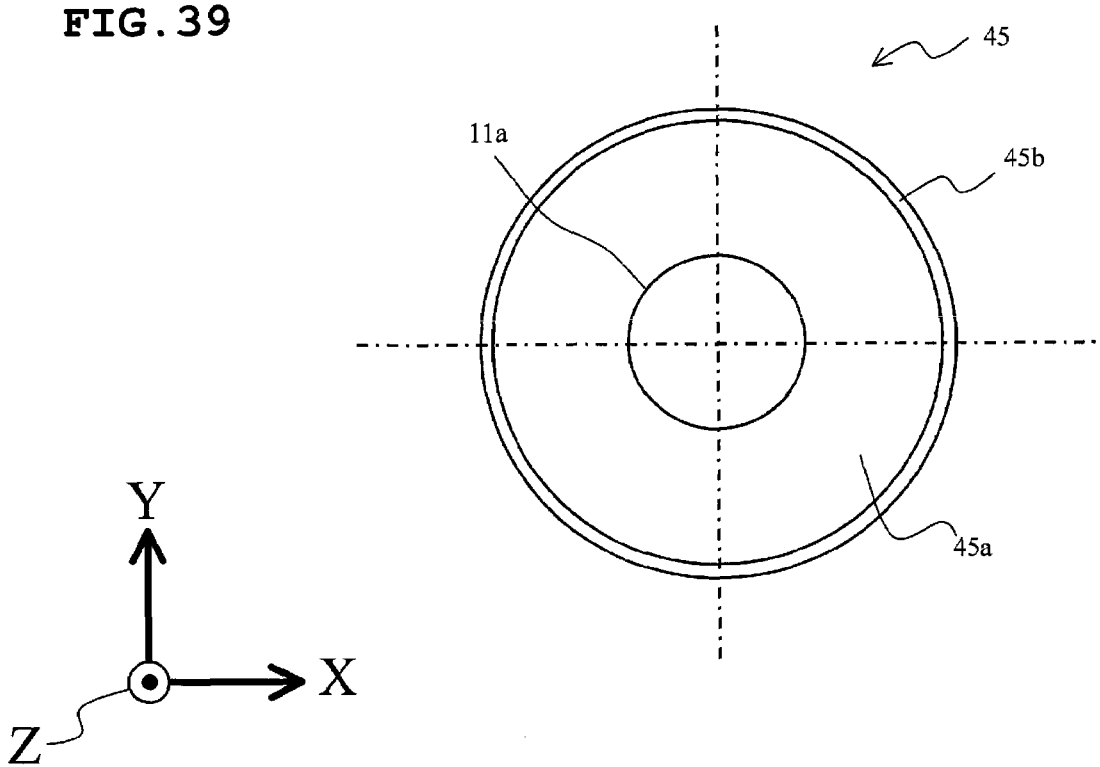
FIG. 39 is an illustration showing the relative positions of one end of the optical fiber and the light receiving plane of a light receiving apparatus.
Figure 40:
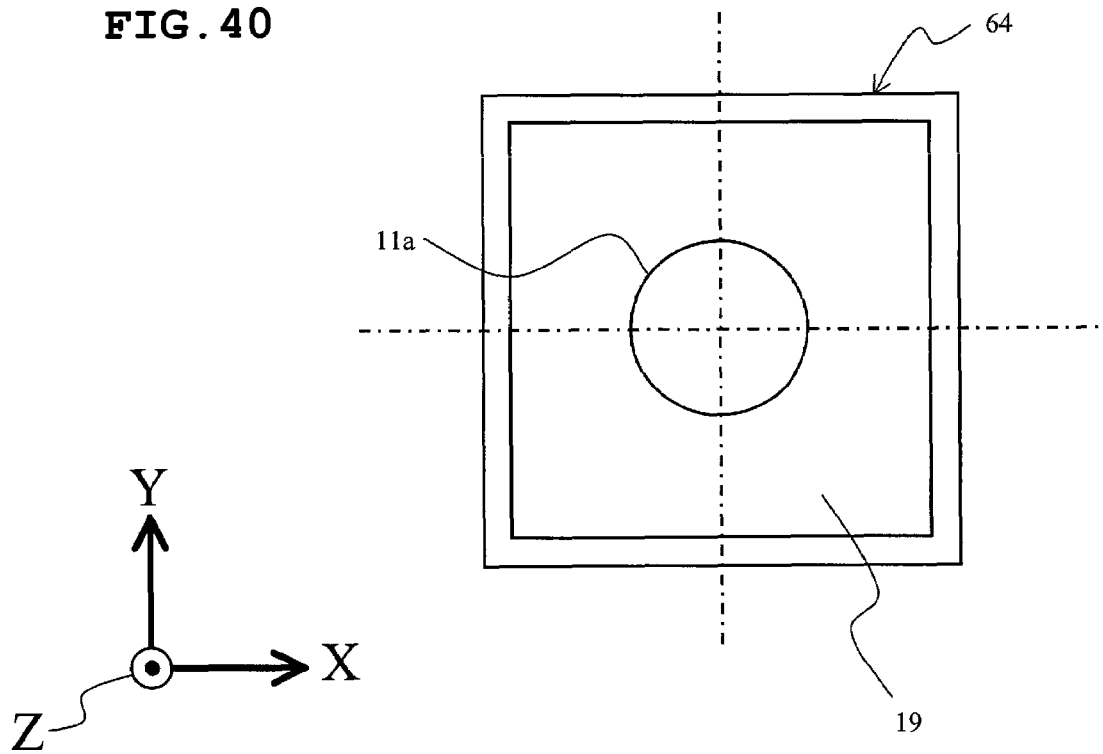
FIG. 40 is an illustration showing the relative positions of the emission end of the tapered waveguide and the light receiving plane of the light receiving device.
Figure 41:
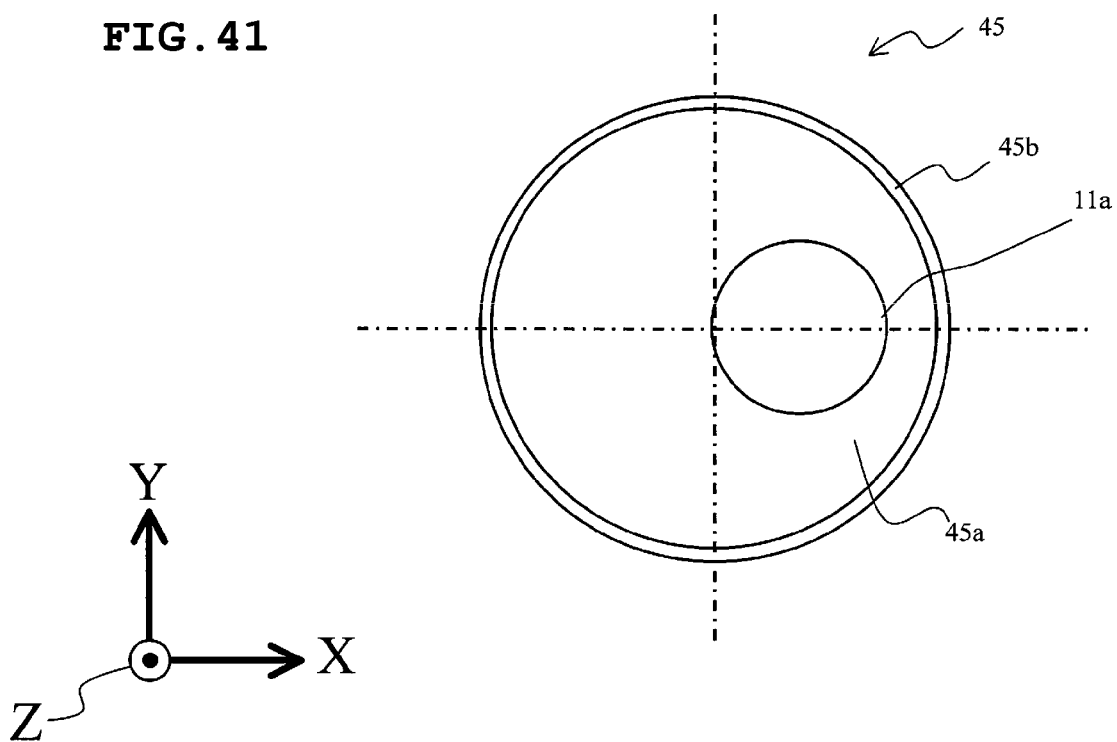
FIG. 41 is an illustration showing the relative positions of one end of the optical fiber and the light receiving device of the light receiving device.
Figure 42:
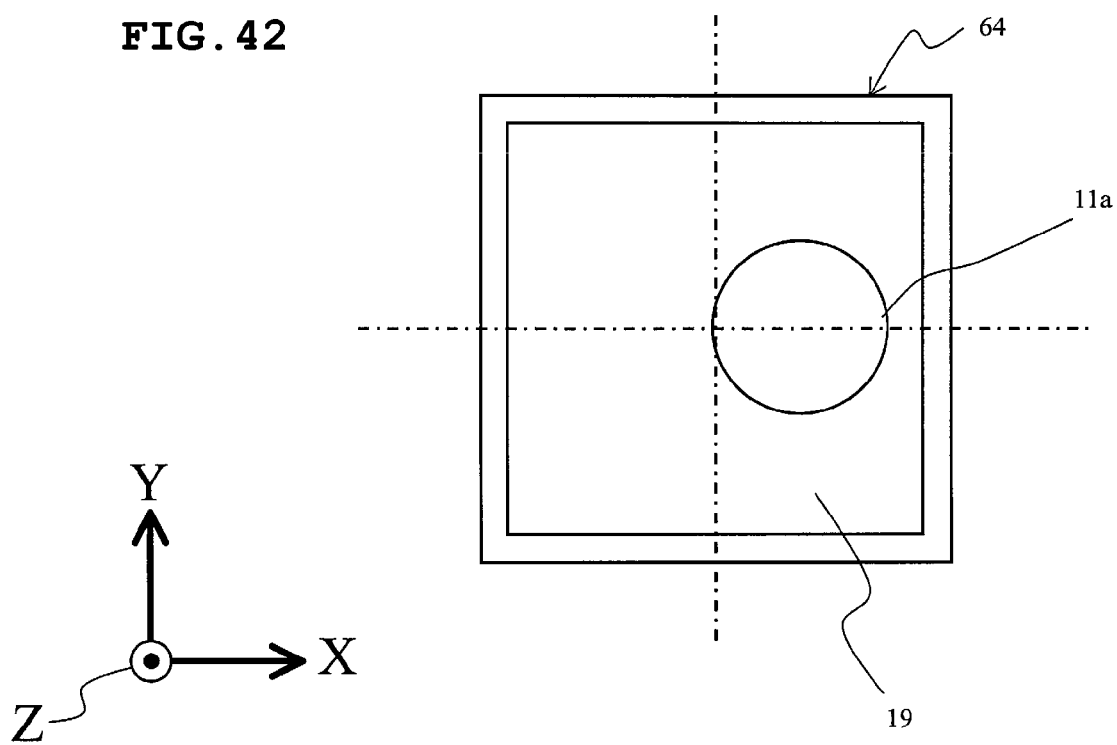
FIG. 42 is an illustration showing the relative positions of the emission end of the tapered waveguide and the light receiving plane of the light receiving device.

FIGS. 39 and 41 show illustrations showing the relative positions of one end 47 of the optical fiber 45 and the light receiving plane 11a of the light receiving device 11 in FIG. 28. FIGS. 40 and 42 show illustrations showing the relative positions of the emission end 15 of the tapered waveguide 64 and the light receiving plane 11a of the light receiving device 11 in FIG. 29.

FIG. 39 is an illustration when the central axis of the optical fiber 46 coincides with the center of the light receiving plane 11a of the light receiving device 11, that is, there is no assembling error between the light receiving device 11 and the optical fiber 45.

FIG. 40 is an illustration when the central axis of the tapered waveguide 64 coincides with the center of the light receiving plane 11a of the light receiving device 11, that is, there is no assembling error between the light receiving device 11 and the tapered waveguide 64.

FIG. 41 is an illustration when the center of the light receiving plane 11a of the light receiving device 11 is present at the coordinates (0.05, 0) of the plane of one end 47, that is, when there is an assembling error between the light receiving device 11 and the optical fiber 45.

FIG. 42 is an illustration when the center of the light receiving plane 11a of the light receiving device 11 is present on the coordinates (0.05, 0), that is, when there is an assembling error between the light receiving device 11 and the tapered waveguide 64. The unit of the coordinates in FIGS. 41 and 42 is mm.

When there is no assembling error between the light receiving device 11 and the optical fiber 45 or tapered waveguide 64 in FIGS. 39 and 40, Table 1 shows a result of simulating the light quantity which can be received by the light receiving device 11 at one end 47 of the optical fiber 45 and the light quantity which can be received by the light receiving device 11 at the emission end 15 of the tapered waveguide 64 at every optical axis position of the light A at the other end 46 of the optical fiber 45. Simulation results show ratios between the light quantity of the light A incoming to the optical fiber 45 and the light quantity received by the light receiving device 11 by attenuation. The units are dB.

TABLE 1

|  | Optical axis position of light A | | | |
|---|---|---|---|---|
|  | A-0 | A-1 | A-2 | A-3 |
| Attenuation when directly connecting light receiving device 11 to one end 47 of optical fiber 45 | −7.06 | −6.96 | −9.69 | −6.40 |
| Attenuation when connecting light receiving device 11 to emission end 15 of tapered waveguide 64 | −8.83 | −8.76 | −8.68 | −8.84 |

When the relative positions of the optical fiber 45 and the light receiving plane 11a of the light receiving device 11 are as shown in FIG. 39, the difference between the optical axis position A-3 at which the attenuation is maximum and the optical axis position A-4 at which the attenuation is minimum is 3.29 dB. As described for FIGS. 31 to 34, the attenuation greatly depends on the optical axis position of the light A. That is, when directly connecting the light receiving device 11 to the optical fiber 45, the light quantity which can be received by the light receiving device 11 is greatly influenced by an assembling error between the light emitting device 10 and the optical fiber 45.

However, when the relative positions of the tapered waveguide 64 and the light receiving plane 11a of the light receiving device 11 are as shown in FIG. 40, the difference between the optical axis position A-4 at which the attenuation is maximum and the optical axis position A-3 at which the attenuation is minimum is 0.16 dB. As shown in FIGS. 35 to 38, because partiality of the NFP at one end 47 of the optical fiber 45 is mitigated at the emission end 15, the difference in attenuation due to the optical axis position of the light A is small.

Therefore, when the light receiving device 11 receives light from the optical fiber 45 through the tapered waveguide 64, it is possible to decrease an assembling error between the light emitting device 10 and the optical fiber 45, and the light receiving device 11 can stably receive optical data from the light emitting device 10.

Table 2 shows a result of simulating the light quantity which can be received by the light receiving device 11 at one end 47 of the optical fiber 45, and the light quantity which can be received by the light receiving device 11 at the emission end 15 of the tapered waveguide 64 at every optical axis position of the light A at the other end 46 of the optical fiber 45 when there is an assembling error between the light receiving device 11 and the optical fiber 45 or tapered waveguide 64 in FIGS. 41 and 42. Similarly to the case of Table 1, Table 2 shows the ratio between the light quantity incoming to the optical fiber 45 and the light quantity received by the light receiving device 11 by attenuation.

TABLE 2

|  | Optical axis position of light A | | | |
|---|---|---|---|---|
|  | A-0 | A-1 | A-2 | A-3 |
| Attenuation when directly connecting light receiving device 11 to one end 47 of optical fiber 45 | −13.66 | −8.48 | −53.44 | −13.37 |
| Attenuation when connecting light receiving device 11 to emission end 15 of tapered waveguide 64 | −9.06 | −8.53 | −10.00 | −8.84 |

When the relative positions of the optical fiber 45 and the light receiving plane 11a of the light receiving device 11 are as shown in FIG. 41, the difference between the optical axis position A-3 at which the attenuation is maximum and the optical axis position A-1 at which the attenuation is minimum is 44.96 dB. As shown in Table 1, the light receiving device 11 is greatly influenced by an assembling error between the light receiving device 10 and the optical fiber 45. Moreover, because of an assembling error between the optical fiber 45 and the light receiving device 11, the influence of the optical axis position of the light A is further increased.

When the relative positions of the tapered waveguide 64 and the light receiving plane 11a of the light receiving device 11 are as shown in FIG. 42, the difference between the optical axis position A-3 at which the attenuation is maximum and the optical axis position A-1 at which the attenuation is minimum is 1.47 dB. As shown in Table 1, the tapered waveguide 64 can decrease the influence of an assembling error between the light emitting device 10 and the optical fiber 45 on the amount of light the light receiving device receives. Moreover, the tapered waveguide 64 can decrease the influence of an assembling error between the tapered waveguide 64 and the light receiving device 11 on the amount of light the light receiving device receives.

When the light receiving device receives light from the optical fiber through the tube-type waveguide, it is possible to decrease the influence of an assembling error between the light emitting device and the optical fiber and an assembling error between the light receiving device and the tube-type waveguide, and the light receiving device can stably receive optical data from the light emitting device.

Therefore, because the light receiving apparatus of the preferred embodiments of the present invention is provided with a tube-type waveguide, it can stably receive optical data even if partiality occurs in the NFP of the light emitted from an end of an optical fiber or even if the partiality of the NFP fluctuates.

A light receiving apparatus of the preferred embodiments of the present invention can be used as an illuminating unit and a laser marking apparatus.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A light receiving apparatus comprising:
   a tube waveguide having an optical waveguiding region arranged to propagate light entering an incident end and exiting an emission end of the tube waveguide through mirror reflection or total reflection;
   a light receiving device connected to the emission end of the tube waveguide to receive the light from the tube waveguide; and
   a multimode optical fiber arranged to transmit light into the optical waveguiding region of the tube waveguide from one end of the multimode optical fiber connected to the incident end of the tube waveguide; wherein
   an area of a cross sectional shape of the optical waveguiding region of the tube waveguide vertical to the propagating direction of light decreases gradually from the incident end to the emission end;
   a cross sectional shape of the optical waveguiding region vertical to a propagating direction of light is polygonal; and
   a size of the optical waveguiding region at a plane of the emission end of the tube waveguide is larger than a size of a light receiving plane of the light receiving device.

2. The light receiving apparatus according to claim 1, wherein a reduction rate in which the area of the cross sectional shape of the optical waveguiding region decreases is decreased from the incident end toward the emission end.

3. A light receiving apparatus comprising:
   a tube waveguide having an optical waveguiding region arranged to propagate light entering an incident end and exiting an emission end of the tube waveguide through mirror reflection or total reflection;
   a light receiving device connected to the emission end of the tube waveguide to receive the light from the tube waveguide; and
   a multimode optical fiber arranged to transmit light into the optical waveguiding region of the tube waveguide from one end of the multimode optical fiber connected to the incident end of the tube waveguide; wherein
   an area of a cross sectional shape of the optical waveguiding region of the tube waveguide vertical to the propagating direction of light decreases gradually from the incident end to the emission end;
   a cross sectional shape of the optical waveguiding region vertical to a propagating direction of light is polygonal; and
   a size of the optical waveguiding region at a plane of the incident end of the tube waveguide is larger than a size of a core at the plane of the one end of the multimode optical fiber.

4. The light receiving apparatus according to claim 3, wherein a reduction rate in which the area of the cross sectional shape of the optical waveguiding region decreases is decreased from the incident end toward the emission end.

5. A light receiving apparatus comprising:
   a tube waveguide having an optical waveguiding region arranged to propagate light entering an incident end and exiting an emission end of the tube waveguide through mirror reflection or total reflection;
   a light receiving device connected to the emission end of the tube waveguide to receive the light from the tube waveguide; and
   a multimode optical fiber arranged to transmit light into the optical waveguiding region of the tube waveguide from one end of the multimode optical fiber connected to the incident end of the tube waveguide; wherein
   an area of a cross sectional shape of the optical waveguiding region of the tube waveguide vertical to the propagating direction of light decreases gradually from the incident end to the emission end;
   a cross sectional shape of the optical waveguiding region vertical to a propagating direction of light is rounded-corner polygonal; and
   a size of the optical waveguiding region at a plane of the emission end of the tube waveguide is larger than a size of a light receiving plane of the light receiving device.

6. The light receiving apparatus according to claim 5, wherein a reduction rate in which the area of the cross sectional shape of the optical waveguiding region decreases is decreased from the incident end toward the emission end.

7. A light receiving apparatus comprising:
   a tube waveguide having an optical waveguiding region arranged to propagate light entering an incident end and exiting an emission end of the tube waveguide through mirror reflection or total reflection;
   a light receiving device connected to the emission end of the tube waveguide to receive the light from the tube waveguide; and
   a multimode optical fiber arranged to transmit light into the optical waveguiding region of the tube waveguide from one end of the multimode optical fiber connected to the incident end of the tube waveguide; wherein
   an area of a cross sectional shape of the optical waveguiding region of the tube waveguide vertical to the propagating direction of light decreases gradually from the incident end to the emission end;
   a cross sectional shape of the optical waveguiding region vertical to a propagating direction of light is rounded-corner polygonal; and
   a size of the optical waveguiding region at a plane of the incident end of the tube waveguide is larger than a size of a core at the plane of the one end of the multimode optical fiber.

8. The light receiving apparatus according to claim 7, wherein a reduction rate in which the area of the cross sectional shape of the optical waveguiding region decreases is decreased from the incident end toward the emission end.

9. A light receiving apparatus comprising:
   a tube waveguide having an optical waveguiding region arranged to propagate light entering an incident end and exiting an emission end of the tube waveguide through mirror reflection or total reflection;
   a light receiving device connected to the emission end of the tube waveguide to receive the light from the tube waveguide; and
   a multimode optical fiber arranged to transmit light into the optical waveguiding region of the tube waveguide from one end of the multimode optical fiber connected to the incident end of the tube waveguide; wherein
   an area of a cross sectional shape of the optical waveguiding region of the tube waveguide vertical to the propagating direction of light decreases gradually from the incident end to the emission end;
   a cross sectional shape of the optical waveguiding region vertical to a propagating direction of light is a shape surrounded by a plurality of curves connected together at respective ends thereof, and points of connection of the plurality of curves being points of singularity; and
   a size of the optical waveguiding region at a plane of the emission end of the tube waveguide is larger than a size of a light receiving plane of the light receiving device.

10. The light receiving apparatus according to claim 9, wherein a reduction rate in which the area of the cross sectional shape of the optical waveguiding region decreases is decreased from the incident end toward the emission end.

11. A light receiving apparatus comprising:
a tube waveguide having an optical waveguiding region arranged to propagate light entering an incident end and exiting an emission end of the tube waveguide through mirror reflection or total reflection;
a light receiving device connected to the emission end of the tube waveguide to receive the light from the tube waveguide; and
a multimode optical fiber arranged to transmit light into the optical waveguiding region of the tube waveguide from one end of the multimode optical fiber connected to the incident end of the tube waveguide; wherein
an area of a cross sectional shape of the optical waveguiding region of the tube waveguide vertical to the propagating direction of light decreases gradually from the incident end to the emission end;
a cross sectional shape of the optical waveguiding region vertical to a propagating direction of light is a shape surrounded by a plurality of curves connected together at respective ends thereof, and points of connection of the plurality of curves being points of singularity; and
a size of the optical waveguiding region at a plane of the incident end of the tube waveguide is larger than a size of a core at the plane of the one end of the multimode optical fiber.

12. The light receiving apparatus according to claim 11, wherein a reduction rate in which the area of the cross sectional shape of the optical waveguiding region decreases is decreased from the incident end toward the emission end.

13. A light receiving apparatus comprising:
a tube waveguide having an optical waveguiding region arranged to propagate light entering an incident end and exiting an emission end of the tube waveguide through mirror reflection or total reflection;
a light receiving device connected to the emission end of the tube waveguide to receive the light from the tube waveguide; and
a multimode optical fiber arranged to transmit light into the optical waveguiding region of the tube waveguide from one end of the multimode optical fiber connected to the incident end of the tube waveguide; wherein
an area of a cross sectional shape of the optical waveguiding region of the tube waveguide vertical to the propagating direction of light decreases gradually from the incident end to the emission end;
a cross sectional shape of the optical waveguiding region vertical to a propagating direction of light is a shape surrounded by at least one line segment and at least one curve, the at least one line segment and the at least one curve being connected together at respective ends thereof; and
a size of the optical waveguiding region at a plane of the emission end of the tube waveguide is larger than a size of a light receiving plane of the light receiving device.

14. The light receiving apparatus according to claim 13, wherein a reduction rate in which the area of the cross sectional shape of the optical waveguiding region decreases is decreased from the incident end toward the emission end.

15. A light receiving apparatus comprising:
a tube waveguide having an optical waveguiding region arranged to propagate light entering an incident end and exiting an emission end of the tube waveguide through mirror reflection or total reflection;
a light receiving device connected to the emission end of the tube waveguide to receive the light from the tube waveguide; and
a multimode optical fiber arranged to transmit light into the optical waveguiding region of the tube waveguide from one end of the multimode optical fiber connected to the incident end of the tube waveguide; wherein
an area of a cross sectional shape of the optical waveguiding region of the tube waveguide vertical to the propagating direction of light decreases gradually from the incident end to the emission end;
a cross sectional shape of the optical waveguiding region vertical to a propagating direction of light is a shape surrounded by at least one line segment and at least one curve, the at least one line segment and the at least one curve being connected together at respective ends thereof; and
a size of the optical waveguiding region at a plane of the incident end of the tube waveguide is larger than a size of a core at the plane of the one end of the multimode optical fiber.

16. The light receiving apparatus according to claim 15, wherein a reduction rate in which the area of the cross sectional shape of the optical waveguiding region decreases is decreased from the incident end toward the emission end.

* * * * *